(12) United States Patent
Kodaka

(10) Patent No.: US 9,047,088 B2
(45) Date of Patent: Jun. 2, 2015

(54) MULTIPROCESSOR SYSTEM AND METHOD OF CONTROLLING POWER

(71) Applicant: Takeshi Kodaka, Kanagawa (JP)

(72) Inventor: Takeshi Kodaka, Kanagawa (JP)

(73) Assignee: Kabushiki Kaisha Toshiba, Minato-Ku, Tokyo (JP)

( * ) Notice: Subject to any disclaimer, the term of this patent is extended or adjusted under 35 U.S.C. 154(b) by 272 days.

(21) Appl. No.: 13/727,866

(22) Filed: Dec. 27, 2012

(65) Prior Publication Data

US 2013/0254576 A1 Sep. 26, 2013

(30) Foreign Application Priority Data

Mar. 23, 2012 (JP) ................................. 2012-066726

(51) Int. Cl.
 *G06F 1/32* (2006.01)
(52) U.S. Cl.
 CPC ............ *G06F 1/3287* (2013.01); *G06F 1/3228* (2013.01); *Y02B 60/1282* (2013.01)
(58) Field of Classification Search
 CPC .............................. G06F 1/3287; G06F 1/3228
 USPC ......... 713/320, 324; 700/12, 22; 712/28, 216; 718/102
 See application file for complete search history.

(56) References Cited

U.S. PATENT DOCUMENTS

2009/0249094 A1 10/2009 Marshall et al.
2010/0299541 A1 11/2010 Ishikawa et al.

FOREIGN PATENT DOCUMENTS

| JP | 2008-129846 | 6/2008 |
| JP | 2010-271930 | 12/2010 |
| WO | 2009-120427 | 10/2009 |

*Primary Examiner* — Stefan Stoynov
(74) *Attorney, Agent, or Firm* — White & Case LLP

(57) ABSTRACT

According to one embodiment, a multiprocessor system includes a plurality of processors, a power supply device and a shared memory. The shared memory includes a thread pool and a thread queue. In the thread pool, threads each having waiting events are registered in association with the numbers of the waiting events. In the thread queue, threads having no waiting event are registered. One or more first processors acquire first thread from the thread queue and execute the first thread. A second processor updates the number of waiting events of a second thread, which is registered in the thread pool, having completion of required procedure for the second thread by the first thread as a waiting event. A third processor operates supply of power to the first processors individually based on the number of threads in the thread queue and the number of waiting events.

20 Claims, 22 Drawing Sheets

| ID | NUMBER OF WAITING EVENTS | EXECUTION START ADDRESS |
|---|---|---|
| 0 | 2 | 0x00800124 |
| 1 | 1 | 0x00800ab0 |
| 2 | | |
| ... | ... | ... |

113

121

PROCESSOR POWER STATE FLAG

1011

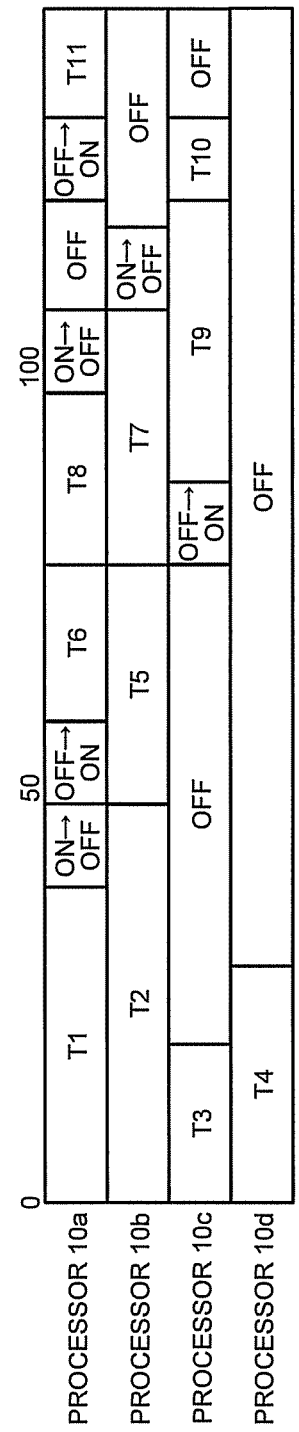

MULTIPROCESSOR SYSTEM AND METHOD OF CONTROLLING POWER

CROSS-REFERENCE TO RELATED APPLICATIONS

This application is based upon and claims the benefit of priority from Japanese Patent Application No. 2012-066726, filed on Mar. 23, 2012; the entire contents of which are incorporated herein by reference.

FIELD

Embodiments described herein relate generally to a multiprocessor system and a method of controlling power.

BACKGROUND

Conventionally, for the purpose of reducing power consumption, there are multiprocessor systems that have a function of stopping and resuming power supply to each processor.

As a technique for reducing the power consumption of a multiprocessor system, for example, a technique may be considered in which the power of a processor is turned on or off based on whether or not a thread is executed by the processor. Generally, when power of a processor transits from the On state to the Off state or from the Off state to the On state, a current corresponding to the electrostatic capacitance of the processor flows, and accordingly, the frequency of transitions between the On and Off states is preferably not high from the viewpoint of low power consumption. However, according to such a technique, in a case where the number of threads (hereinafter, referred to as executable threads) that are executable instantly frequently changes, the frequency of transitions between the On and Off states of power increases, whereby there are cases where the power consumption increases.

In addition, it takes some time for the transition between the states of power. Thus, in a case where a time in which the On state or the Off state of the power is maintained should be short. If the time for transiting between the On state and the Off state is long, the performance of the multiprocessor system is lowered.

BRIEF DESCRIPTION OF THE DRAWINGS

FIG. 12B is a diagram that illustrates transitions of the states of processors of a multiprocessor system according to a comparative example;

DETAILED DESCRIPTION

In general, according to one embodiment, a multiprocessor system includes a plurality of processors, a power supply device and a shared memory. The power supply device supplies power to each of the processors individually. The shared memory stores a plurality of threads, each thread being executed by one of the plurality of processors. The shared memory includes a thread pool and a thread queue. In the thread pool, threads having waiting events are registered. In the thread queue, threads having no waiting event are registered. The plurality of processors includes one or more first processors, a second processor and a third processor. The one or more first processors each acquires first thread from the thread queue and executes the first thread when power is supplied from the power supply device. The second processor updates the number of waiting events of a second thread, which is registered in the thread pool, having completion of required procedure, such as data generation for the second thread, by the first thread as a waiting event and registers the second thread in the thread queue when the number of the waiting events of the second thread is zero. The third processor stops or resumes supply of power from the power supply device to the first processors individually based on the number of threads that are registered in the thread queue and the number of threads of which the number of waiting events is a first threshold value or less.

Exemplary embodiments of a multiprocessor system and a method of controlling power will be explained below in detail with reference to the accompanying drawings. The present invention is not limited to the following embodiments.

First Embodiment

Figure 1:
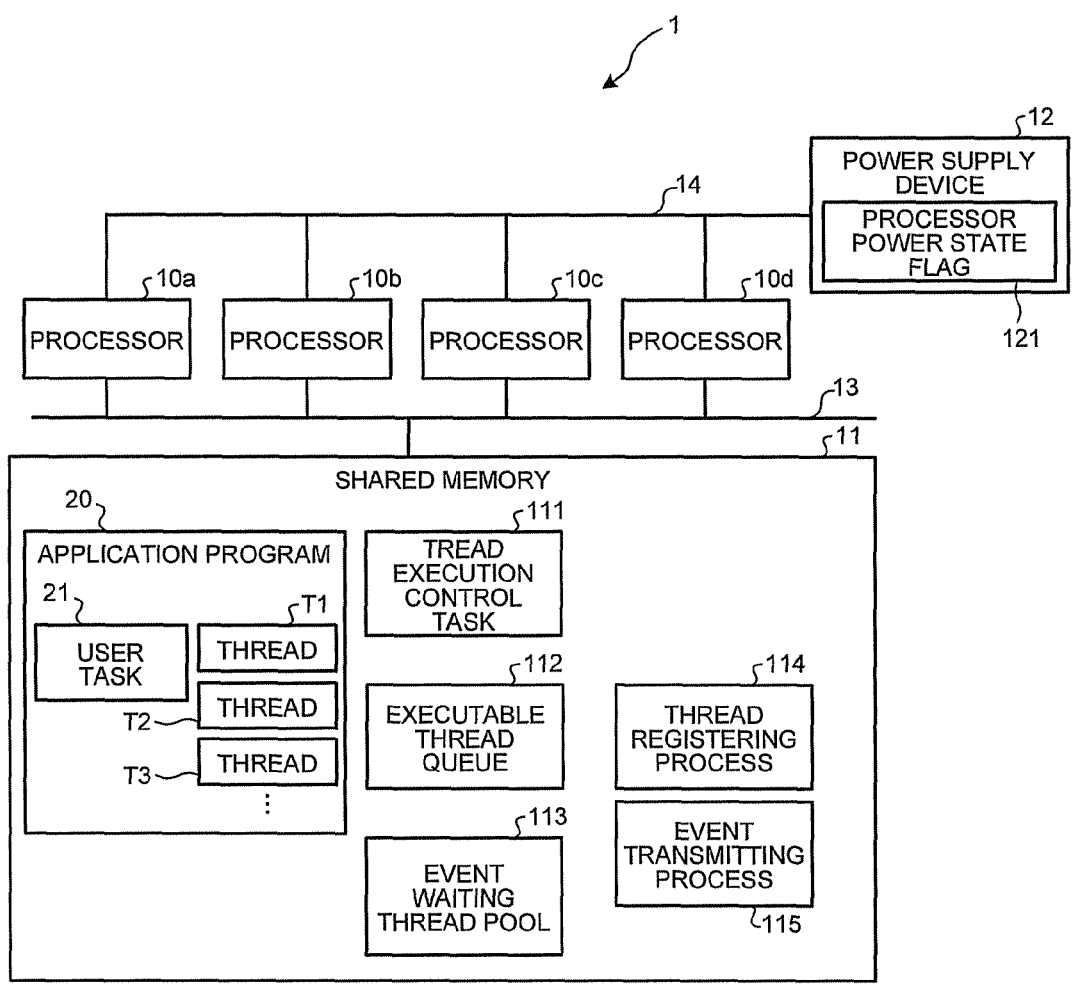
FIG. 1 is a configuration diagram of a multiprocessor system according to a first embodiment.

FIG. 1 is a configuration diagram of a multiprocessor system according to a first embodiment. The multiprocessor system 1 illustrated in FIG. 1 includes: four processors 10a to 10d; a shared memory 11; a power supply device 12; a bus 13; and power supply lines 14. The processors 10a to 10d and the shared memory 11 are connected to the bus 13. The processors 10a to 10d can access the shared memory 11 through the bus 13. The power supply device 12 supplies power to the processors 10a to 10d through the power supply lines 14.

In FIG. 1, although the power supply lines 14 are represented to be connected to be common to the processors 10a to 10d, actually, the power supply lines 14 are individually connected to the processors 10a to 10d. The power supply device 12 can respectively supply power or stop supplying power to the processors 10a to 10d. For example, the processors 10a to 10d designate a target processor and supply an instruction that is used for supplying power or stopping supplying power to the power supply device 12 through dedicated lines which are not illustrated. The power supply device 12 performs a procedure corresponding to the content of the instruction for the target processor. Hereinafter, a state in which power is supplied to a processor will be referred to as a power-on state, and a state in which power is not supplied to a processor will be referred to as a power-off state.

The shared memory 11, for example, is configured by memory, a register, an external storage device, or a combination thereof. The shared memory 11 stores an application program 20, which is a program to be executed by the processors 10a to 10d, therein in advance. The application program 20 is configured by a plurality of threads T1, T2, T3, . . . and a user task 21 that manages the threads.

Figure 2:
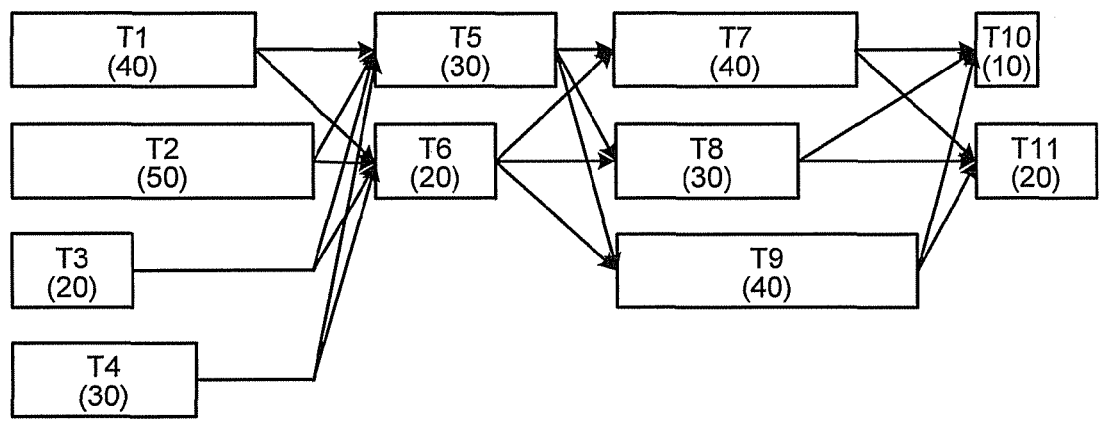
FIG. 2 is a diagram that illustrates an example of a structure of a plurality of threads that are included in an application program.

FIG. 2 is a diagram that illustrates an example of a structure of a plurality of threads that are included in the application program 20. In FIG. 2, each number that is enclosed by a parenthesis in a box representing a thread execution time when it runs on a processor, and each arrow between boxes represents a relation between events. For example, the thread T1 has an execution time of 40 and transmits events to the threads T5 and T6 when the execution is completed. The thread T5 is in an executable state when the execution of the threads T1 to T4 is completed, in other words, when events from the threads T1 to T4 are all received. Hereinafter, a completion of execution of a thread that the thread needs to wait in order to be in the executable state will be referred to as a waiting event. In other words, the waiting events of the thread T5 are the completion of the execution of threads T1 to T4. In addition, a thread that cannot be immediately executable due to remain waiting events of the thread will be referred to as an event waiting thread.

The shared memory 11 stores: a thread execution control task 111 that controls the execution of a thread and performs power control of the processors 10a to 10d; a thread registering process 114 that registers a thread included in the application program 20 to an executable thread queue 112 or an event waiting thread pool 113 to be described later; and an event transmitting process 115 that is called by a thread when the thread transmits an event, in advance. The thread execution control task 111, the thread registering process 114, and the event transmitting process 115 are stored in the shared memory 11 as program modules.

In addition, the shared memory 11 includes the executable thread queue 112 and the event waiting thread pool 113. The executable thread queue 112 and the event waiting thread pool 113 are data structures used for managing threads.

Figure 3:
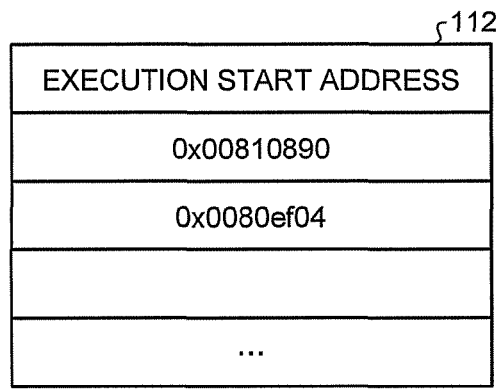
FIG. 3 is a diagram that illustrates an example of a data structure of an executable thread queue.

The executable thread queue 112, for example, employs FIFO, and information that specifies an executable thread is registered therein. FIG. 3 is a diagram that illustrates an example of the data structure of the executable thread queue 112. In the executable thread queue 112 illustrated in FIG. 3, execution start addresses of executable threads are registered. An execution start address is a start address of a program module that is an entity of a thread.

Figures 4, 5:
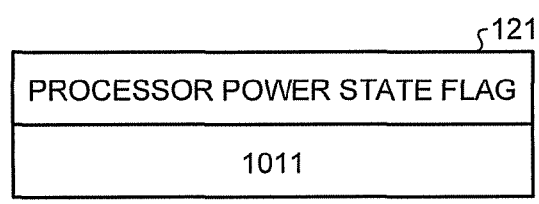
FIG. 4 is a diagram that illustrates an example of a data structure of an event waiting thread pool.
FIG. 5 is a diagram that illustrates an example of a processor power state flag.

In the event waiting thread pool 113, an entry in which the number of waiting events is recorded for each event waiting thread is recorded. FIG. 4 is a diagram that illustrates an example of the data structure of the event waiting thread pool 113. In the event waiting thread pool 113 illustrated in FIG. 4, an ID, the number of waiting events, and an execution start address of an event waiting thread are registered for each event waiting thread. In addition, the number of waiting events described in each entry decreases by the event transmitting process 115 each time when the execution of a waiting event of the thread specified by the ID or the execution start address is completed. When the number of waiting events is zero, the corresponding entry is removed from the event waiting thread pool 113, and a thread that is represented by the entry is registered in the executable thread queue 112.

The power supply device 12 includes a processor power state flag (flag information) 121 that represents whether the processors 10a to 10d are in the power-on state or in the power-off state for each processor. Each one of the processors 10a to 10d can recognize whether the other processors are in the power-on state or the power-off state by referring to the processor power state flag 121. FIG. 5 is a diagram that illustrates an example of the processor power state flag 121. According to this example, the processor power state flag 121 includes information of one bit that represents "1" in the case of the power-on state or "0" in the case of the power-off state for each one of the four processors 10a to 10d. The processor power state flag 121, for example, is maintained in a register or a small-size memory that is disposed inside or outside the power supply device 12.

Next, the operation of the multiprocessor system 1 according to the first embodiment will be described with reference to FIGS. 6 to 11. Although the processors 10a to 10d operate under the control of a program module (the user task 21, the plurality of threads, the thread execution control task 111, the thread registering process 114, or the event transmitting process 115) that is stored in the shared memory 11, in subsequent description of the operation, a corresponding program module will be described as an operation subject.

Figure 6:
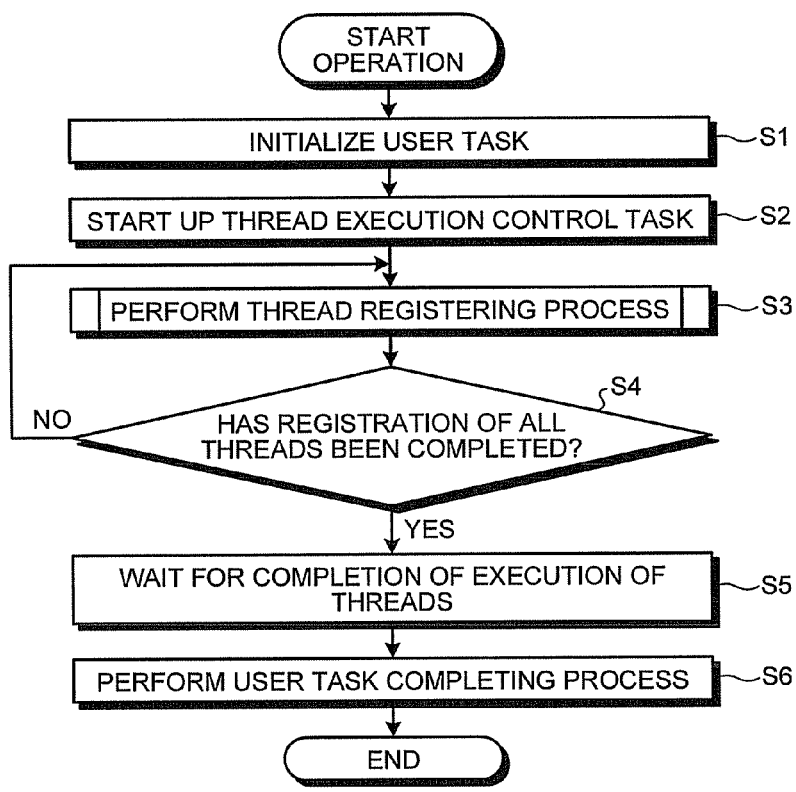
FIG. 6 is a flowchart that illustrates the operation of a user task according to the first embodiment.

The operation of the multiprocessor system 1 according to the first embodiment is started after the user task 21 is started up in one of the processors 10a to 10d. FIG. 6 is a flowchart that illustrates the operation of the user task 21. When the user task 21 is started up, the user task 21 initializes itself in Step S1 and then starts up the thread execution control task 111 in all the processors other than the processor that executes the user task 21 in Step S2. Here, it is assumed that the initial state of any of all the processors 10a to 10d is the power-on state. Subsequently, the user task 21 designates one of a plurality of threads included in the application program 20 and performs the thread registering process 114 in Step S3.

Figure 7:
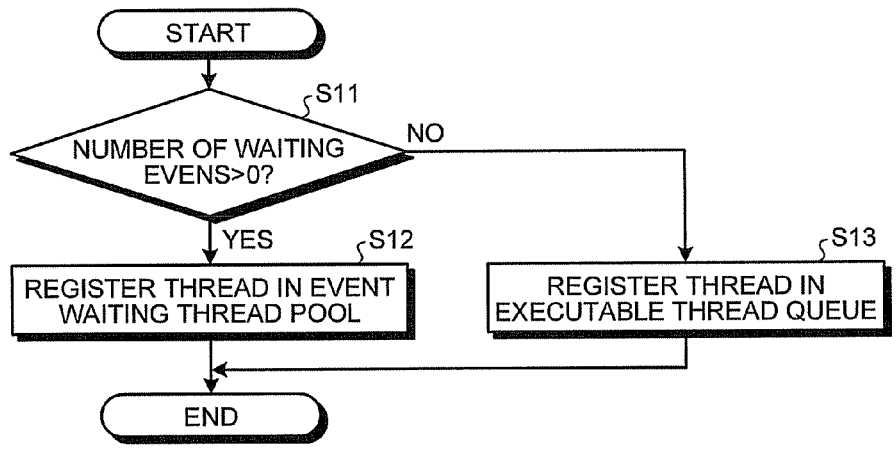
FIG. 7 is a flowchart that illustrates the operation of a thread registering process according to the first embodiment.

FIG. 7 is a flowchart that illustrates the operation of the thread registering process 114. The thread registering process 114 determines whether or not a designated thread has the number of waiting events that is larger than zero (in other words, one or more waiting events) in Step S11. In a case where the designated thread has one or more waiting events (Yes in Step S11), the designated thread is an event waiting thread, and accordingly, the thread registering process 114 registers the designated thread in the event waiting thread pool 113 in Step S12. In other words, the thread registering process 114 registers an ID, the number of waiting events, and an execution start address of the designated thread in the event waiting thread pool 113. On the other hand, in a case where the designated thread has less than one waiting event (in other words, the number of waiting events is zero) (No in Step S11), the designated thread is an executable thread, and accordingly, the thread registering process 114 registers the designated thread in the executable thread queue 112 in Step S13. In other words, the thread registering process 114 registers the execution start address of the designated thread in the executable thread queue 112. After Step S12 or S13, the operation of the thread registering process 114 for the designated thread ends.

After Step S3, the user task 21 determines whether or not the thread registering process 114 for all the threads included in the application program 20 has been completed in Step S4. In a case where there is a thread for which the thread registering process 114 has not been completed (No in Step S4), the user task 21 designates the thread for which the thread registering process 114 has not been completed and performs the process of Step S3. On the other hand, in a case where the thread registering process 114 for all the threads has been completed (Yes in Step S4), the user task 21 waits until the execution of all the registered threads is completed in Step S5, and, after completion of the execution of all the threads, performs the process of completing the user task 21 in Step S6, thereby ending the operation.

Figure 8:
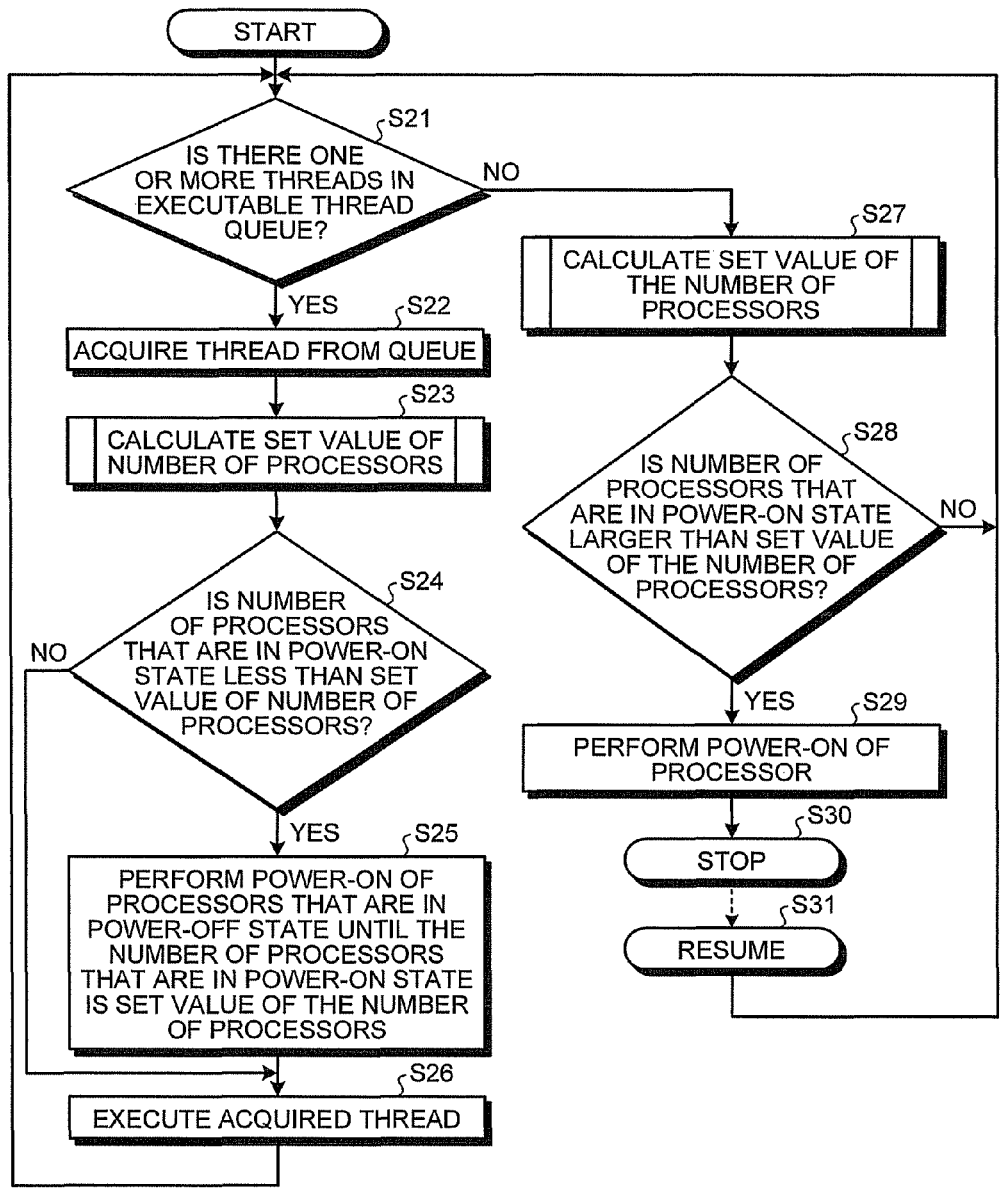
FIG. 8 is a flowchart that illustrates the operation of a thread execution control task according to the first embodiment.

FIG. 8 is a flowchart that illustrates the operation of the thread execution control task 111 that is started up in Step S2. First, the thread execution control task 111 determines whether or not one or more threads are registered in the executable thread queue 112 in Step S21. In a case where one or more threads are registered in the executable thread queue 112 (Yes in Step S21), the thread execution control task 111 extracts one thread from the executable thread queue 112 in Step S22. Then, the thread execution control task 111 calculates a set value of the number of processors that are to be in the power-on state in Step S23.

Figure 9:
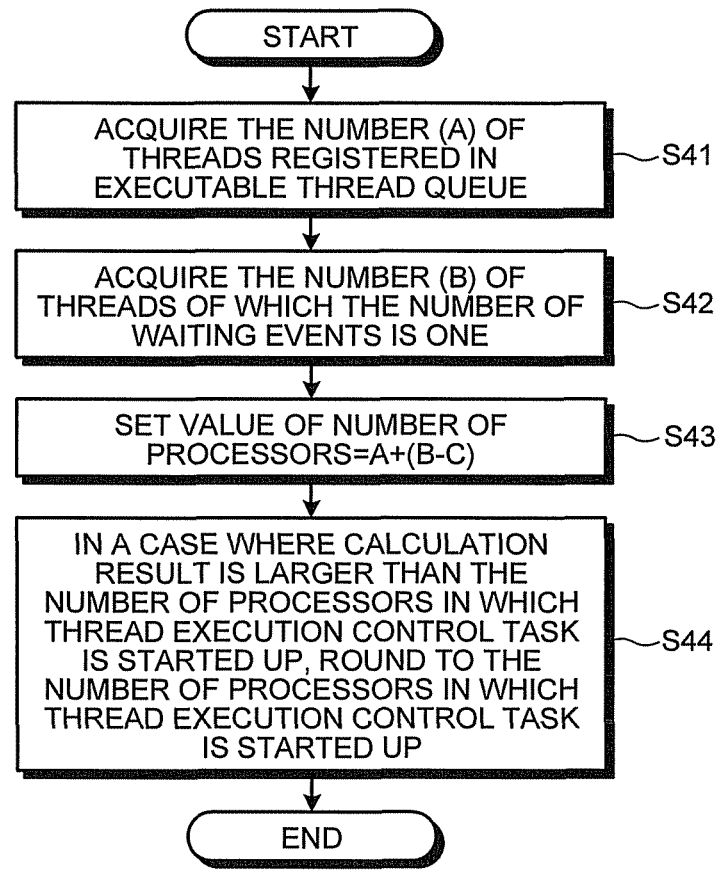
FIG. 9 is a flowchart of a process of calculating a set value of the number of processors according to the first embodiment.

FIG. 9 is a flowchart of a process of calculating a set value of the number of processors that is performed in Step S23. The thread execution control task 111 acquires the number (A) of threads that are registered in the executable thread queue 112 and the number (B) of threads of which the numbers of waiting events registered in the event waiting thread pool 113 correspond to a value (here, one) that is set in advance in Steps S41 and S42. Then, the thread execution control task 111 calculates A+(B−C) using a threshold value (C) of the number of event waiting threads that is set in advance and sets an acquired value as the set value of the number of processors in Step S43. Then, in a case where the set value of the number of processors is larger than the number of processors for which the thread execution control task 111 has been started up by the process of Step S2, the thread execution control task 111 rounds the calculated set value of the number of processors as the number of processors for which the thread execution control task 111 has been started up in Step S44 and ends the process of Step S23. For example, in a case where the number of executable threads that are registered in the executable thread queue 112 is one, the number of threads, of which the number of waiting events is one, out of the threads registered in the event waiting thread pool 113 is two, and the threshold value of the number of event waiting threads is one, the set value of the number of processors is two.

After Step S23, the thread execution control task 111 determines whether or not the number of processors that are in the power-on state at that time point is less than the set value of the number of processors by referring to the processor power state flag 121 in Step S24. In a case where the number of processors that are in the power-on state is less than the set value of the number of processors (Yes in Step S24), the thread execution control task 111 causes processors, which are in the power-off state, out of the processors 10a to 10d to transit to the power-on state until the number of processors that are in the power-on state is the same as the set value of the number of processors in Step S25. Then, the thread execution control task 111 executes the thread acquired by the process of Step S22 in Step S26.

Figure 10:
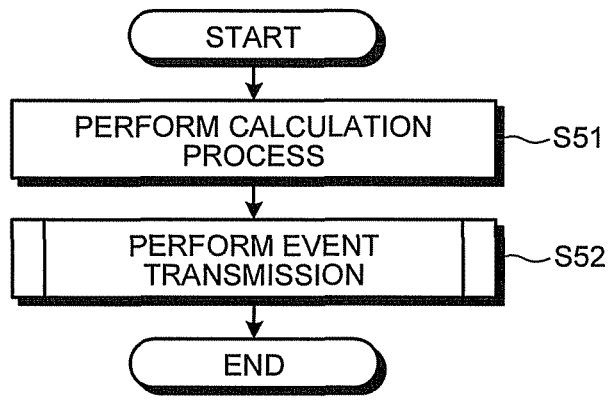
FIG. 10 is a flowchart that illustrates the operation of a thread according to the first embodiment.

FIG. 10 is a flowchart of Step S26 (in other words, the operation of a thread). The thread performs an intrinsic calculation process that is based on a program module of the thread in Step S51. When the calculation process is completed, the thread performs an event transmitting process 115 in Step S52 and ends the operation.

Figure 11:
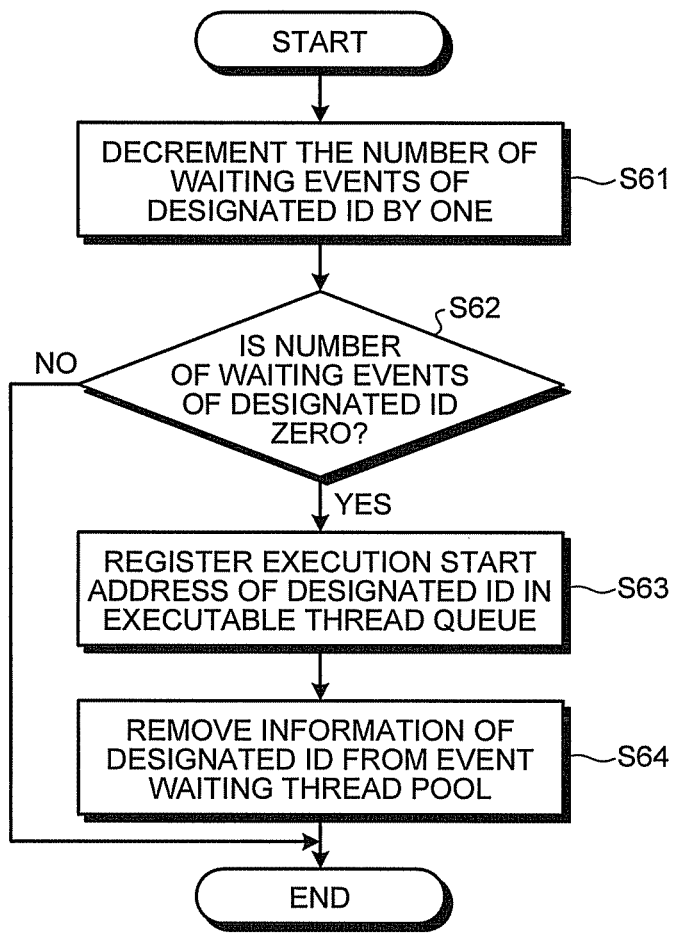
FIG. 11 is a flowchart that illustrates the operation of an event transmitting process according to the first embodiment.

FIG. 11 is a flowchart that illustrates the operation of the event transmitting process 115. The event transmitting process 115 searches the event waiting thread pool 113 with an ID of a thread having the thread that has called the event transmitting process 115 as a waiting event used as a key, decreases the number of waiting events described in the retrieved entry by one in Step S61, and determines whether or not the number of waiting events after the decrease is zero in Step S62. Here, it is assumed that each thread knows the IDs of threads that have completion of the execution of the thread as waiting events. In a case where the number of waiting events is zero (Yes in Step S62), the thread registers the thread of which the number of waiting events is zero in the executable thread queue 112 in Step S63 and removes an entry corresponding to the thread of which the number of waiting events is zero from the event waiting thread pool 113 in Step S64, and ends the operation. In a case where the number of waiting events is not zero (No in Step S62), Steps S63 and S64 are skipped.

In addition, in a case where there is a plurality of threads each having the thread, which has called the event transmitting process 115, as a waiting event, the event transmitting process 115 is performed for each thread having the thread that has called the event transmitting process 115 as a waiting event. Here, although the event transmitting process 115 has been described to be performed after the thread completes the calculation process that is intrinsic to the thread, in a case where an event can be transmitted in the middle of the calculation process, the event may be configured to be transmitted in the middle of the calculation process.

When the execution of the thread is completed, the thread execution control task 111 performs the process of Step S21. In a case where the number of processors that are in the power-on state exceeds the set value of the number of processors (No in Step S24), Step S25 is skipped.

In a case where there is no thread that is registered in the executable thread queue 112 (No in Step S21), the thread execution control task 111 calculates a set value of the number of processors in the same procedure as that of Step S23 in Step S27. Then, the thread execution control task 111 determines whether or not the number of processors that are in the power-on state at that time point is larger than the set value of the number of processors in Step S28. In a case where the number of processors that are in the power-on state is larger than the number of set value of the number of processors (Yes in Step S28), the thread execution control task 111 causes the processor that executes the task 111 to transit to the power-off state in Step S29 and stops the operation in Step S30. When the processor that executes the task 111 is caused to transit to the power-on state by the thread execution control task 111 that is executed by another processor in Step S31, the thread execution control task 111 performs the process of Step S21. On the other hand, in a case where the number of processors that are in the power-on state is less than the set value of the number of processors (No in Step S28), the thread execution control task 111 performs the process of Step S21.

Figure 12A:
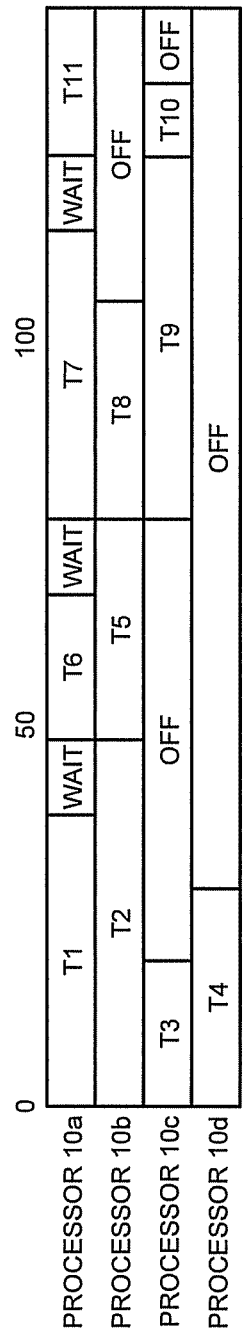
FIG. 12A is a diagram that illustrates transitions of the states of processors of the multiprocessor system according to the first embodiment.

FIG. 12A is a diagram that illustrates transitions of the states of processors of the multiprocessor system according to the first embodiment. FIG. 12A illustrates transitions of the states of processors 10a to 10d in a case where the thread having the structure illustrated in FIG. 2 is executed. For example, immediately after the elapse of time 40, threads T5 and T6 correspond to event waiting threads of which the number of waiting events is one. At that time point, although the execution of the thread T1 ends, and the number of executable threads is zero, the processor 10a does has not transit to the power-off state. When the execution of the thread T2 is completed, threads T5 and T6 are registered in the executable thread queue 112. Then, the processor 10a that has maintained to be in the power-on state starts the execution of the thread T6, and the processor 10b that has completed the execution of the thread T2 starts the execution of the thread T5.

FIG. 12B is a diagram that illustrates transitions of the states of processors of a multiprocessor system to which a technique (comparative example) that is compared with the first embodiment is applied. According to the comparative example, when a thread is registered in the executable thread queue, the processor is caused to transit to the power-on state. Then, after the execution of the thread is completed by the processor, in a case where there is no thread that can be acquired in the executable thread queue, the processor is caused to transit to the power-off state. According to the comparative example, for example, after the execution of the thread T1 is completed, the processor 10a consumes a time required for a state transition and then transits to the power-off state. Then, after the execution of the thread T2 is completed, the processor 10a consumes a time required for a state transition again and then transits to the power-on state. As above, according to the comparative example, a frequency of the transition between the power-on state and the power-off state is higher than that of the first embodiment, and accordingly, the power consumed for the transition increases. In addition, the processor 10a completes the execution 20 after that of the case of the first embodiment. The reason for this is that there are too many transitions between the power-on state and the power-off state, and accordingly, a time required for the transitions relatively increases with respect to a time required for the execution of the thread.

According to the first embodiment, since the processors transit between the power-on state and the power-off state with the number of event waiting threads of which the number of the waiting events is one (in other words, the number of threads that become executable threads in the near future) being taken into account, the frequency of the transition can decrease. Accordingly, the power consumption can be reduced while performance degradation is suppressed.

In the description presented above, the processor that executes a thread has been described to update the event waiting thread pool 113 and the executable thread queue 112 as a part of the event transmitting process 115 of the thread. However, a processor that executes a thread and transmits an event of the thread and a processor that updates the event waiting thread pool 113 and the executable thread queue 112 may be different from each other.

In addition, a processor that executes the thread execution control task 111 has been described to execute a thread and perform power control of the processor and the other processors based on the number of threads registered in the executable thread queue 112 and the number of threads registered in the event waiting thread pool 113. However, a processor that performs only a function of acquiring and executing a thread out of the functions of the thread execution control task 111 and a processor that performs power control of the processors 10a to 10d may be different from each other. In other words, a specific processor that performs power control of the processors 10a to 10d may be prepared.

As described above, the multiprocessor system 1 according to the first embodiment of the present invention individually stops or resumes power supply to the processors that execute the thread execution control task 111 from the power supply device 12 based on the number of threads registered in the executable thread queue 112 and the number of threads of which the number of waiting events registered in the event waiting thread pool 113 is a predetermined threshold value or more. Accordingly, since the transition between the power-on state and the power-off state is performed with the number of threads that become executable in the near further being taken into account, the power consumption can be reduced while performance degradation is suppressed.

In addition, the multiprocessor system 1 calculates a set value of the number of processors by adding the number B of threads of which the number of waiting events is the predetermined threshold value or more to the number A of threads registered in the executable thread queue 112 and subtracting the threshold value C of the number of event waiting threads, which is determined in advance, from a resultant value and stops or resumes the supply of power to the processors 10a to 10d such that the number of processors 10a to 10d for which power supply is turned on is the same as the set value of the number of processors, and accordingly, power consumption can be reduced while performance degradation is suppressed.

Furthermore, the processors 10a to 10d that execute threads under the thread execution control task 111 resume the supply of power to the other processors 10a to 10d for which the supply of power is stopped when the number of processors 10a to 10d for which the supply of power is turned on is less than the set value of the number of processors and stop the supply of power to the processors themselves when the number of processors 10a to 10d to which power is supplied is larger than the set value of the number of processors, whereby control of stopping or resuming the supply of power to the processors 10a to 10d can be realized without additionally preparing a power control processor.

In addition, since one of the processors 10a to 10d register a plurality of threads that are stored in the shared memory 11 under the control of the user task 21 in the event waiting thread pool 113 or the executable thread queue 112 based on the number of waiting events, the threads can be classified at the time of start-up.

Furthermore, the power supply device 12 includes the processor power state flag 121 that describes whether power is supplied or stopped respectively for the processors 10a to 10d, and the processors 10a to 10d specify the number of processors that are in the power-on state by referring to the processor power state flag 121. Accordingly, the processors 10a to 10d can check the power states of the other processors 10a to 10d by employing a simple configuration.

Second Embodiment

In a case where the threshold value of the number of event waiting threads is fixed to one, when the number of event waiting threads of which the number of the waiting event is one rapidly increases, the number of processors that wait in the power-on state without executing any thread increases, whereby a situation occurs in which the power consumption increases. Thus, a multiprocessor system according to a second embodiment is configured such that the threshold value of the number of event waiting threads can be changed.

Figure 13:
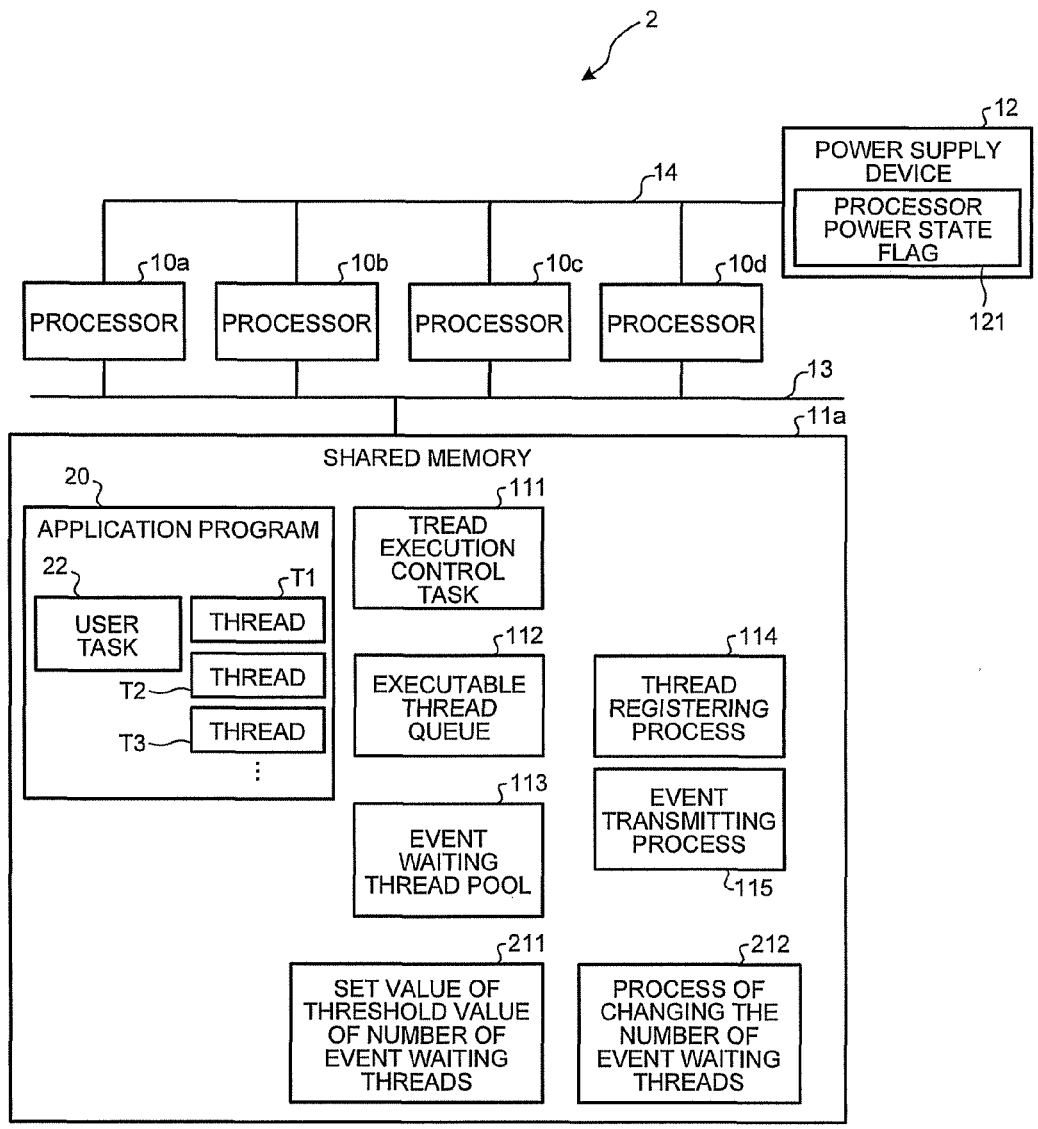
FIG. 13 is a configuration diagram of a multiprocessor system according to a second embodiment.

FIG. 13 is a configuration diagram of the multiprocessor system according to the second embodiment. In description of the second embodiment, the same name and the same reference numeral are assigned to the same constituent element as that of the first embodiment, and duplicate description will not be presented.

The multiprocessor system 2 illustrated in FIG. 13 includes: four processors 10a to 10d; a shared memory 11a; a power supply device 12; a bus 13; and power supply lines 14. The shared memory 11a stores a process 212 of changing the threshold value of the number of event waiting threads in advance, in addition to the configuration of the first embodiment. In addition, a set value 211 of the threshold value of the number of event waiting threads is stored in the shared memory 11a. The set value 211 of the threshold value of the number of event waiting threads is changed by the process 212 of changing the number of event waiting threads.

Figure 14:
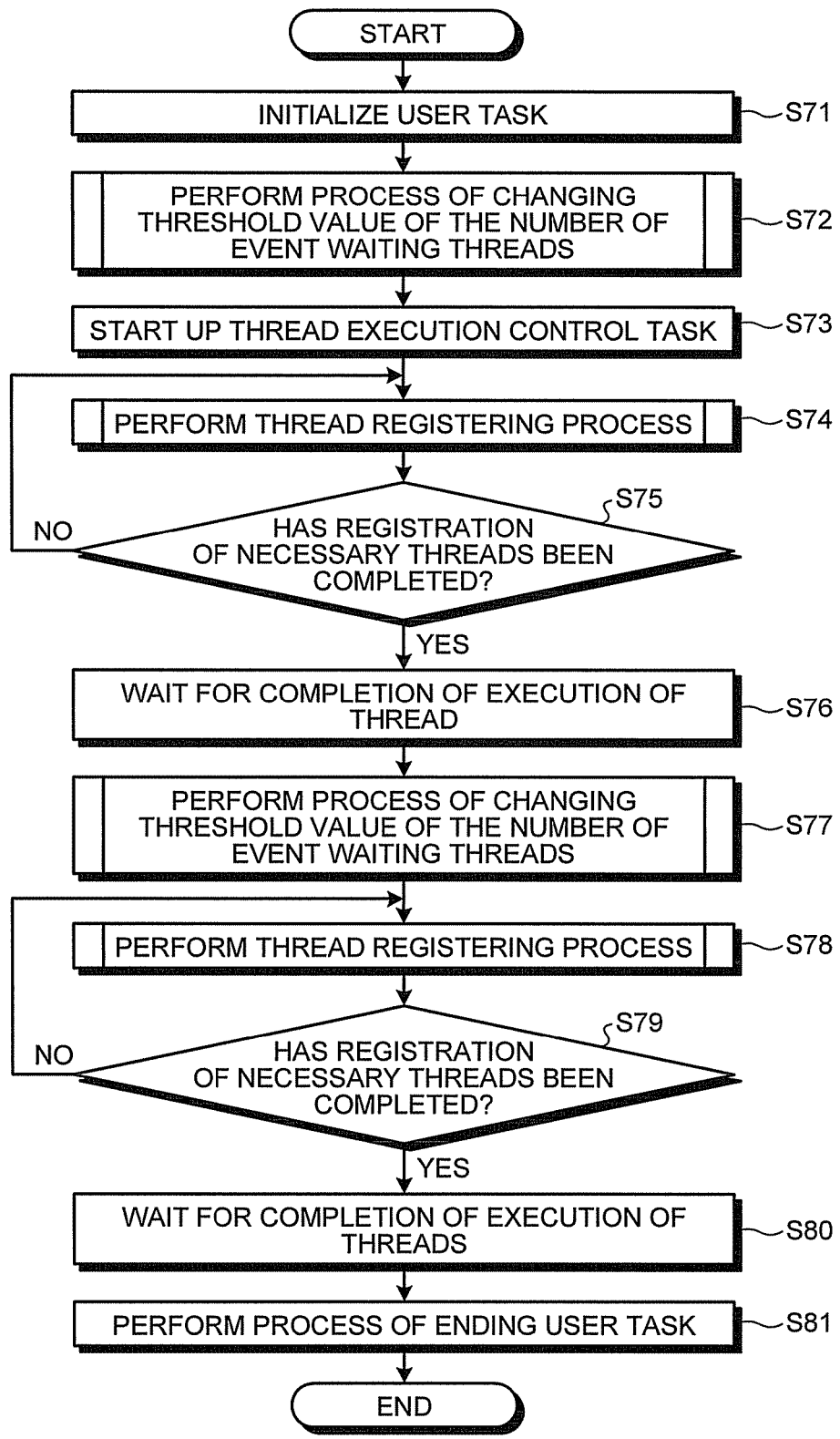
FIG. 14 is a flowchart that illustrates the operation of a user task according to the second embodiment.

FIG. 14 is a flowchart that illustrates the operation of a user task 22 according to the second embodiment. When the user task 22 is started up, the user task 22 initializes itself in Step S71 and performs the process 212 of changing the number of event waiting threads so as to initially set the set value 211 of the threshold value of the number of event waiting threads in Step S72. Here, the process 212 of changing the number of event waiting threads sets a value that is designated by the user task 22 as the set value 211 of the threshold value of the number of event waiting threads. The operation of the process 212 of changing the number of event waiting threads will be described later.

Then, the user task 22 starts up the thread execution control task 111 in all the processors other than the processor that executes the user task 22 in Step S73. Subsequently, the user task 22 designates one of threads that are included in the application program 20 and performs a thread registering process 114 in Step S74. Then, the user task 22 determines whether or not the thread registering process 114 for all the threads has been completed in Step S75. In a case where the thread registering process 114 for all the threads has not been completed (No in Step S75), the user task 22 designates a thread for which the thread registering process 114 has not been completed and performs the process of Step S74. On the other hand, in a case where the thread registering process 114 for all the threads has been completed (Yes in Step S75), the user task 22 waits until the completion of execution of all the registered threads in Step S76.

After the completion of execution of all the registered threads, the user task 22 changes the set value 211 of the threshold value of the number of event waiting threads by performing the process 212 of changing the number of event waiting threads again in Step S77, designates one of threads that are included in the application program 20 and performs the thread registering process 114 in Step S78. Then, the user task 22 determines whether or not the thread registering process 114 for all the threads has been completed in Step S79. In a case where the thread registering process 114 for all the threads has not been completed (No in Step S79), the user task 22 designates a thread for which the thread registering process 114 has not been completed and performs the operation of Step S78. On the other hand, in a case where the thread registering process 114 for all the threads has been completed (Yes in Step S79), the user task 22 waits until the execution of all the registered threads is completed in Step S80. After the execution of all the registered threads is completed, the user task 22 ends the operation by performing a process of completing the user task 22 in Step S81.

Figure 15:
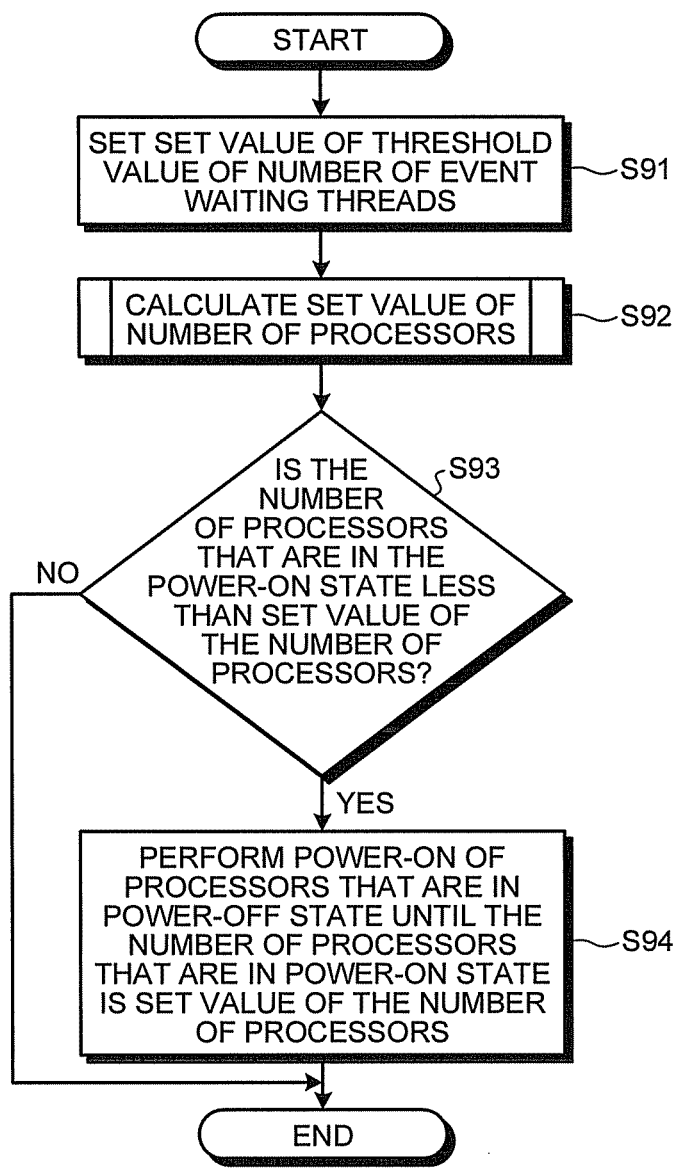
FIG. 15 is a flowchart that illustrates the operation of a process of changing the number of event waiting threads according to the second embodiment.

FIG. 15 is a flowchart that illustrates the operation of the process 212 of changing the number of event waiting threads. The process 212 of changing the number of event waiting threads sets a value that is programmed in the user task 22 in advance as the set value 211 of the threshold value of the number of event waiting threads in Step S91 and calculates the set value of the number of processors in Step S92. Then, the process 212 of changing the number of event waiting threads determines whether or not the number of processors that are in the power-on state at that time point is less than the set value of the number of processors in Step S93. In a case where the number of processors that are in the power-on state is less than the set value of the number of processors (Yes in Step S93), the process 212 of changing the number of event waiting threads causes processors that are in the power-off state to the power-on state until the number of processors that are in the power-on state is the same as the set value of the number of processors in Step S94 and ends the process. On the other hand, in a case where the number of processors that are in the power-on state is the set value of the number of processors or more (No in Step S93), the process of Step S94 is skipped.

Figure 16:
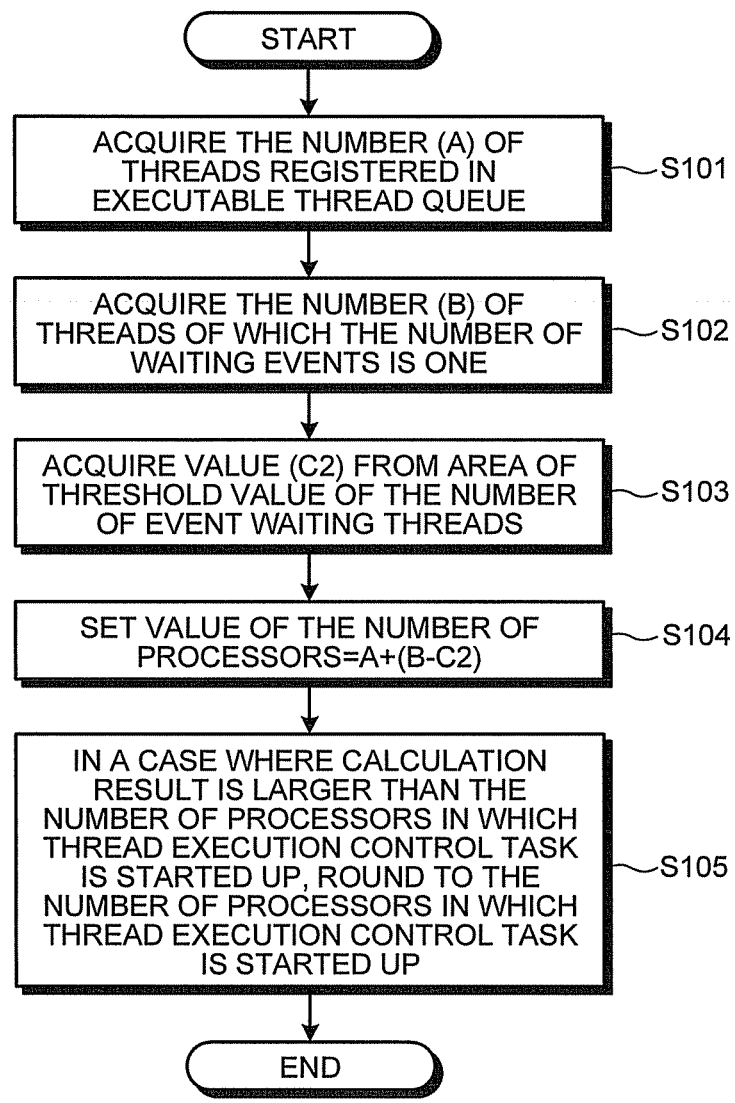
FIG. 16 is a flowchart of a process of calculating a set value of the number of processors that is performed in the multiprocessor system according to the second embodiment.

FIG. 16 is a flowchart of the process of calculating a set value of the number of processors that is performed in the multiprocessor system 2 according to the second embodiment. First, the process 212 of changing the number of event waiting threads acquires the number (A) of threads that are registered in the executable thread queue 112 and the number (B) of threads of which the numbers of waiting events registered in the event waiting thread pool 113 correspond to one in Steps S101 and S102. Then, the process 212 of changing the number of event waiting threads reads out the set value 211 (C2) of the threshold value of the number of event waiting threads in Step S103, calculates A+(B−C2), and sets an acquired value as the set value of the number of processors in Step S104. Then, in a case where the set value of the number of processors is larger than the number of processors for which the thread execution control task 111 is started up by the process of Step S73, the process 212 of changing the number of event waiting threads rounds the calculated set value of the number of processors as the number of processors that perform the thread execution control task 111 in Step S105 and ends the process of calculating the set value of the number of processors.

In addition, also when the thread execution control task 111 calculates the set value of the number of processors, the thread execution control task 111 calculates the set value of the number of processors in the same procedure as that illustrated in FIG. 16.

In the description presented above, although the user task 22 has been described to set or change the set value 211 of the threshold value of the number of event waiting threads at timing programmed in advance, for example, one processor out of the processors 10a to 10d may be configured to perform a task of dynamically changing the set value 211 of the threshold value of the number of event waiting threads based on the structure of a plurality of threads included in the application program 20. For example, this task can increase or decrease the set value 211 of the threshold value of the number of event waiting threads in accordance with an increase or decrease in the number of event waiting threads of which the number of waiting events is one.

As above, since the multiprocessor system 2 according to the second embodiment dynamically changes the set value 211 of the threshold value of the number of event waiting threads at timing that is programmed in advance or timing that is based on the structure of the plurality of threads included in the application program 20, for example, when the number of threads of which the number of waiting events is one or more increases, by changing the set value 211 of the threshold value of the number of event waiting threads to a larger value, the number of processors that wait in the power-on state can decrease, whereby more efficient power control can be performed.

Third Embodiment

Even in a case where the set value of the number of processors is calculated using the number of threads of which the number of waiting events is one, when the application program includes a plurality of threads each having a short execution time, the number of event waiting threads of which the number of waiting events is one frequently changes. As a result, a situation occurs in which the frequency of stopping or resuming the supply of power cannot decrease much. Thus, a multiprocessor system according to a third embodiment sets a value that is one or more and can be changed as a threshold value and calculates the set value of the number of processors using the number of threads of which the number of waiting events is the threshold value or less.

Figure 17:
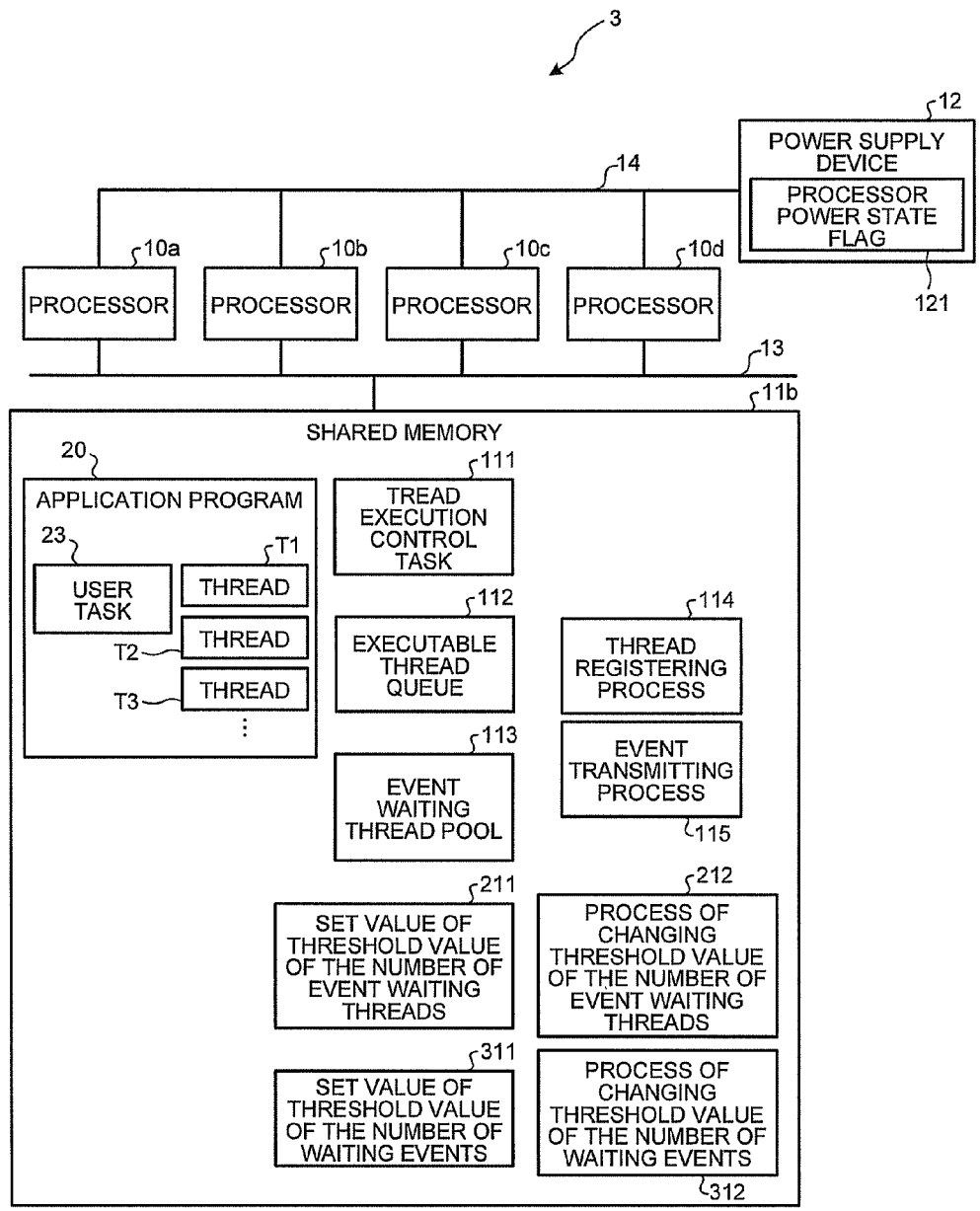
FIG. 17 is a configuration diagram of a multiprocessor system according to a third embodiment.

FIG. 17 is a configuration diagram of the multiprocessor system according to the third embodiment. In description of the third embodiment, the same name and the same reference numeral are assigned to the same constituent element as that of the second embodiment, and duplicate description will not be presented.

The multiprocessor system 3 illustrated in FIG. 17 includes: four processors 10a to 10d; a shared memory 11b; a power supply device 12; a bus 13; and power supply lines 14. The shared memory 11b stores a process 312 of changing the threshold value of the number of waiting events in advance, in addition to the configuration of the second embodiment. In addition, a set value 311 of the threshold value of the number of waiting events is further stored in the shared memory 11b. The set value 311 of the threshold value of the number of waiting events is changed by the process 312 of changing the threshold value of the number of waiting events.

A user task 23, in addition to the procedure described with reference to FIG. 14, performs the process 312 of changing the threshold value of the number of waiting events at timing that is programmed in the user task 23 in advance. Here, it is assumed that the user task 23 sets a value to be set as the set value 311 of the threshold value of the number of waiting events and performs the process 312 of changing the threshold value of the number of waiting events.

Figure 18:
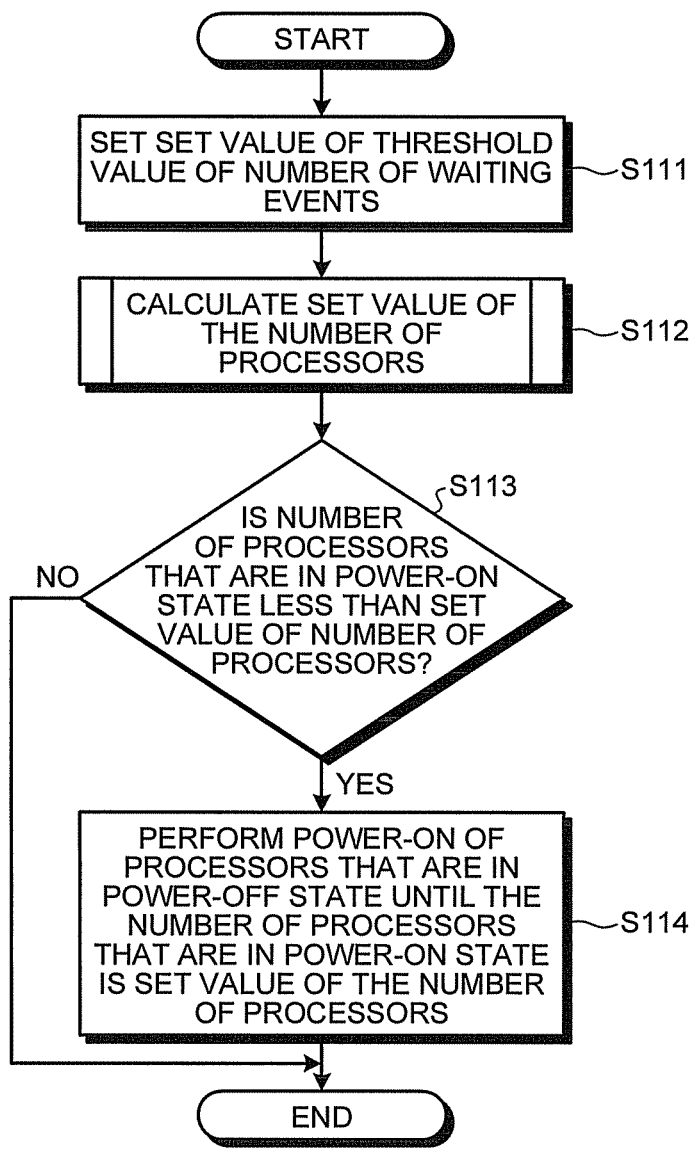
FIG. 18 is a flowchart that illustrates the operation of a process of changing a threshold value of the number of waiting events according to the third embodiment.

FIG. 18 is a flowchart that illustrates the operation of the process 312 of changing the threshold value of the number of waiting events. First, the process 312 of changing the threshold value of the number of waiting events waits for a designated value provided from the user task 23, sets the designated value as the set value 311 of the threshold value of the number of events in Step S111, and calculates the set value of the number of processors in Step S112. Then, the process 312 of changing the threshold value of the number of waiting events determines whether or not the number of processors that are in the power-on-state at that time point is less than the set value of the number of processors in Step S113. In a case where the number of processors that are in the power-on state is less than the set value of the number of processors (Yes in Step S113), the process 312 of changing the threshold value of the number of waiting events causes processors that are in the power-off state to transit to the power-on state until the number of processors that are in the power-on state is the same as the set value of the number of processors in Step S114 and ends the process. On the other hand, in a case where the number of processors that are in the power-on state is the set value of the number of processors or more (No in Step S113), the process of Step S114 is skipped.

Figure 19:
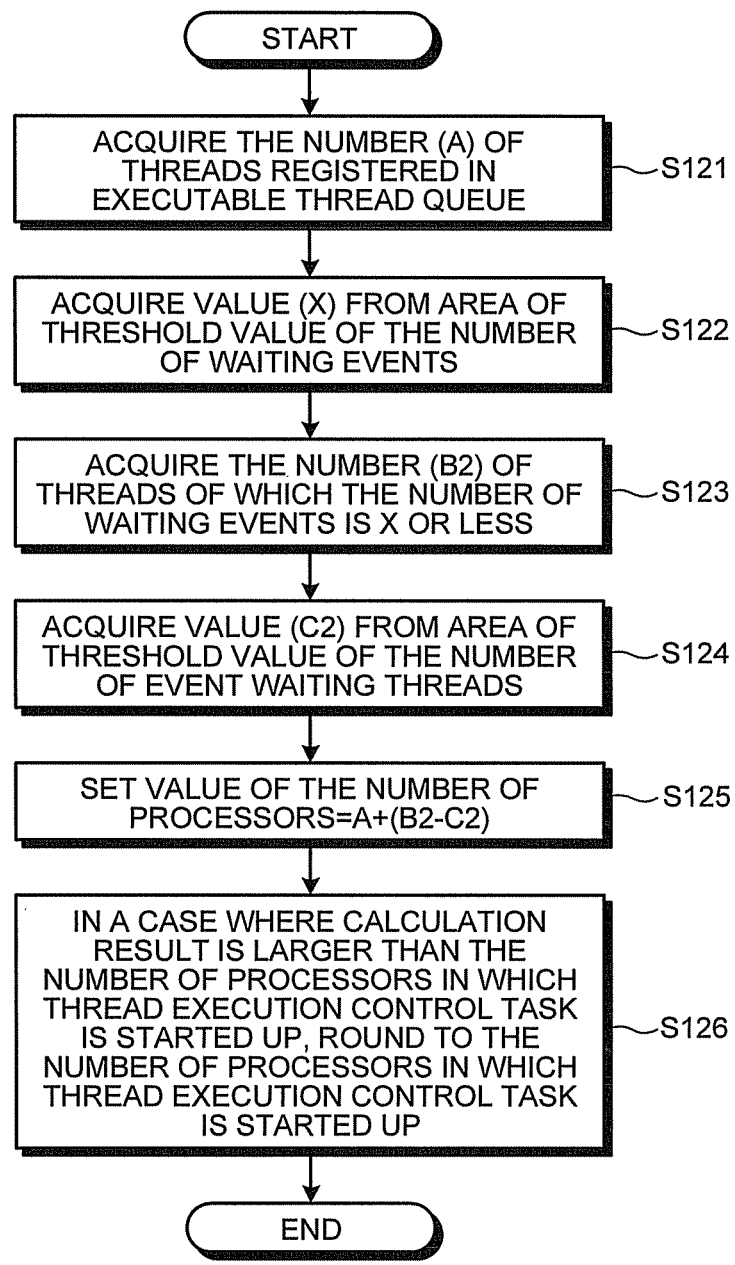
FIG. 19 is a flowchart of a process of calculating the set value of the number of processors that is performed in a multiprocessor system according to the third embodiment.

FIG. 19 is flowchart of a process of calculating the set value of the number of processors that is performed in the multiprocessor system 3 according to the third embodiment. First, the process 312 of changing the threshold value of the number of waiting events acquires the number (A) of threads that are registered in the executable thread queue 112 in Step S121. Then, the process 312 of changing the threshold value of the number of waiting events reads out the set value 311 (X) of the threshold value of the number of waiting events in Step S122 and acquires the number (B2) of threads of which the number of waiting events registered in the event waiting thread pool 113 is X or less in Step S123. Then, the process 312 of changing the threshold value of the number of waiting events reads out the set value 211 (C2) of the threshold value of the number of event waiting threads in Step S124, calculates A+(B2−C2), and sets an acquired value as the set value of the number of processors in Step S125. Then, in a case where the set value of the number of processors is larger than the number of processors for which the thread execution control task 111 is started up by the process of Step S73, the process 312 of changing the threshold value of the number of waiting events rounds the calculated set value of the number of processors as the number of processors that perform the thread execution control task 111 in Step S126 and ends the process of calculating the set value of the number of processors.

In addition, also when the thread execution control task 111 calculates the set value of the number of processors, the thread execution control task 111 calculates the set value of the number of processors in the same procedure as that illustrated in FIG. 19. In addition, also when the process 212 of changing the number of event waiting threads, the process 212 of changing the number of event waiting threads calculates the set value of the number of processors in the same procedure as that illustrated in FIG. 19.

In the description presented above, although the user task 23 has been described to set or change the set value 311 of the threshold value of the number of waiting events at timing that is programmed in advance, for example, one processor out of the processors 10a to 10d may be configured to perform a task of dynamically changing the set value 311 of the threshold value of the number of waiting events based on the structure of a plurality of threads that are included in the application program 20. For example, in a case where the application program 20 is a program for reproducing a moving image, the same structure of a thread is periodically repeated. This task can predict timing when a plurality of threads each having a short execution time simultaneously become executable threads by analyzing the structure of the thread that is periodically repeated. This task can increase the set value 311 of the threshold value of the number of waiting events at the predicted timing.

As above, since the multiprocessor system 3 according to the third embodiment dynamically changes the set value 311 of the threshold value of the number of waiting events at timing that is programmed in advance or timing that is based on the structure of a plurality of threads that are included in the application program 20, the power control can be performed more efficiently.

Fourth Embodiment

The selection of a processor to transit from the power-off state to the power-on state may be performed based on a predetermined rule. A multiprocessor system according to a fourth embodiment causes a process having later timing of the transition to the power-off state to transit to the power-on state with higher priority.

Figure 20:
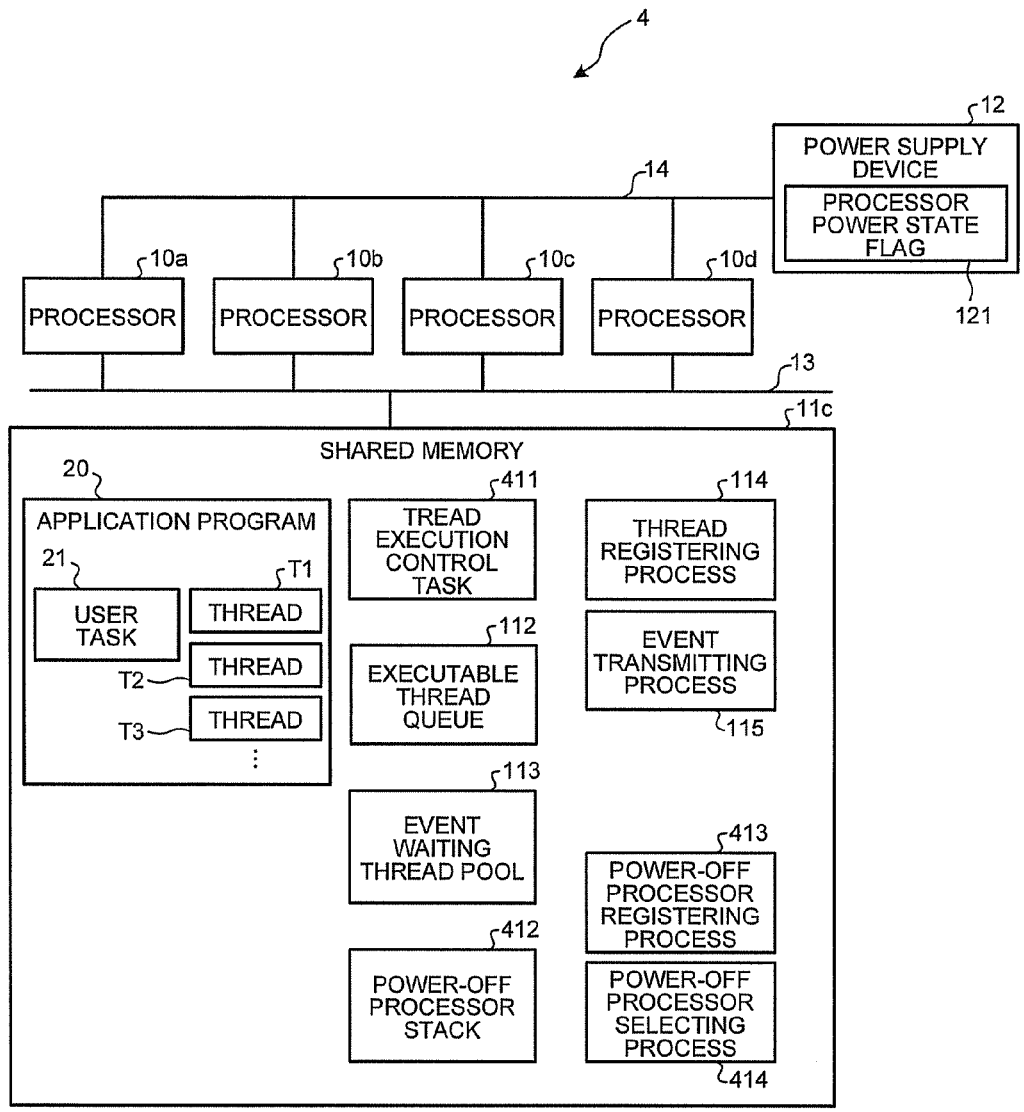
FIG. 20 is a configuration diagram of a multiprocessor system according to a fourth embodiment.

FIG. 20 is a configuration diagram of the multiprocessor system according to the fourth embodiment. In description of the fourth embodiment, the same name and the same reference numeral are assigned to the same constituent element as that of the first embodiment, and duplicate description will not be presented.

The multiprocessor system 4 according to the fourth embodiment includes: four processors 10a to 10d; a shared memory 11c; a power supply device 12; a bus 13; and power supply lines 14. The shared memory 11c stores a thread execution control task 411, a thread registering process 114, an event transmitting process 115, a power-off processor registering process 413, and a power-off processor selecting process 414 in advance. In addition, the shared memory 11c includes an executable thread queue 112, an event waiting thread pool 113, and a power-off processor stack 412. The power-off processor stack 412 is a data structure in which information used for identifying a processor that is in the power-off state is stacked.

Figure 21:
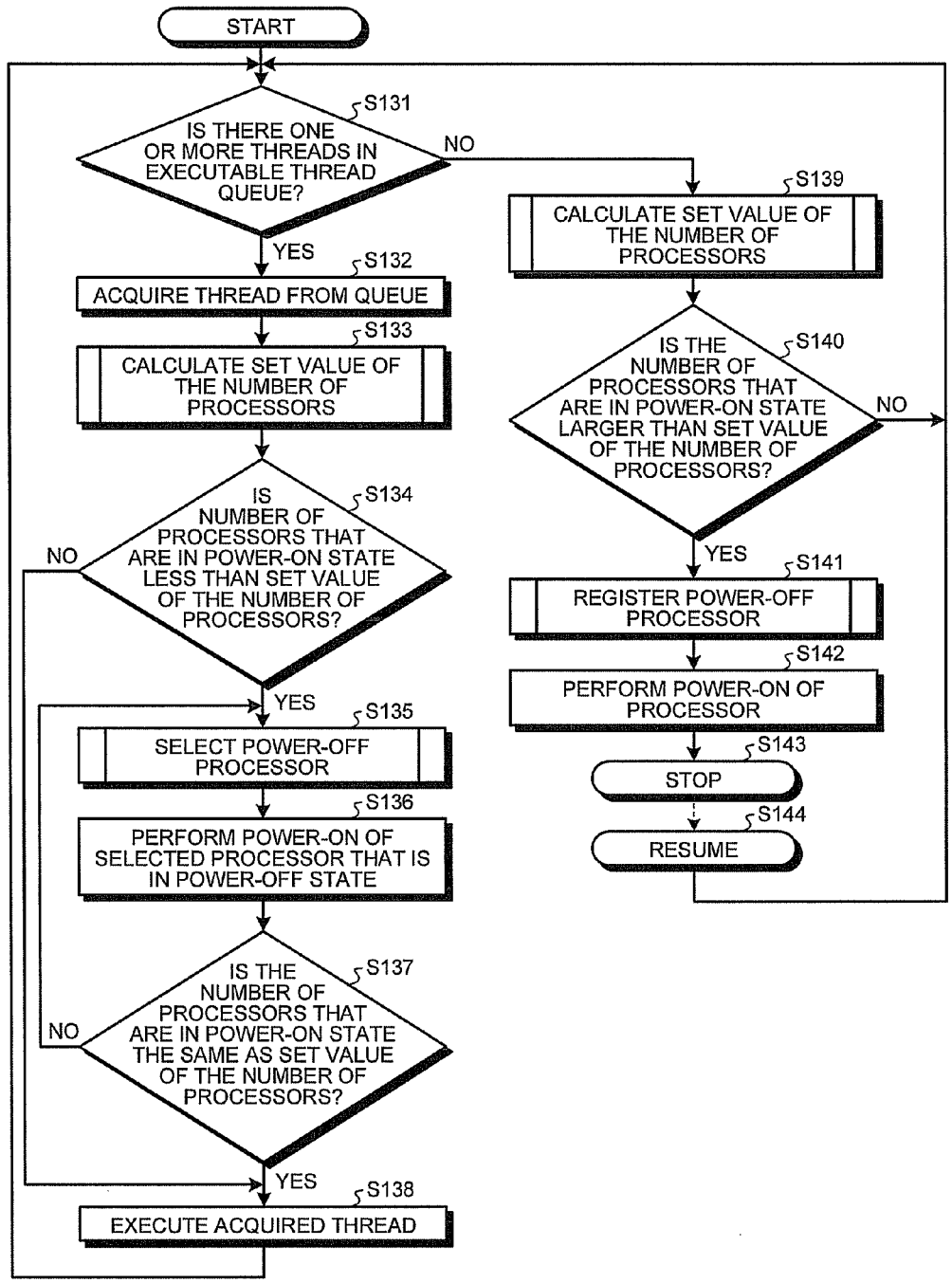
FIG. 21 is a flowchart that illustrates the operation of a thread execution control task according to the fourth embodiment.

FIG. 21 is a flowchart that illustrates the operation of the thread execution control task 411 according to the fourth embodiment. First, the thread execution control task 411 determines whether or not one or more threads are registered in the executable thread queue 112 in Step S131. In a case where one or more threads are registered in the executable thread queue 112 (Yes in Step S131), the thread execution control task 411 extracts one thread from the executable thread queue 112 in Step S132. Then, the thread execution control task 411 calculates the set value of the number of processors in Step S133. Then, the thread execution control task 411 determines whether or not the number of processors that are in the power-on state at that time point is less than the set value of the number of processors in Step S134. In a case where the number of processors that are in the power-on state at that time point is less than the set value of the number of processors (Yes in Step S134), the thread execution control task 411 performs the power-off processor selecting process 414 in Step S135.

Figure 22:
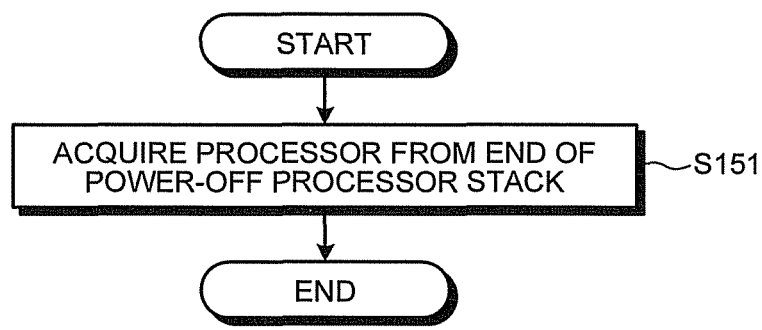
FIG. 22 is a flowchart that illustrates the operation of a power-off processor selecting process according to the fourth embodiment.

FIG. 22 is a flowchart that illustrates the operation of the power-off processor selecting process 414. The power-off processor selecting process 414 extracts identification information of processors that is registered at the end of the power-off processor stack 412 in Step S151 and ends the operation.

The thread execution control task 411 causes a processor, which is in the power-off state, represented by the identification information extracted by the process of Step S135 to transit to the power-on state in Step S136 and determines whether or not the number of processors that are in the power-on state at that time point is the same as the set value of the number of processors in Step S137. In a case where the number of processors that are in the power-on state is not same as the set value of the number of processors (No in Step S137), the thread execution control task 411 performs the process of Step S135. On the other hand, in a case where the number of processors that are in the power-on state is the same as the set value of the number of processors (Yes in Step S137), the thread execution control task 411 executes the thread acquired by the process of Step S132 in Step S138. Then, when the execution of the thread is completed, the thread execution control task 411 performs the process of Step S131.

In a case where there is no thread that is registered in the executable thread queue 112 (No in Step S131), the thread execution control task 411 calculates the set value of the number of processors in Step S139. Then, the thread execution control task 411 determines whether or not the number of processors that are in the power-on state at that time point is larger than the set value of the number of processors in Step S140. In a case where the number of processors that are in the power-on state is larger than the set value of the number of processors (Yes in Step S140), the thread execution control task 411 performs the power-off processor registering process 413 in Step S141.

Figure 23:
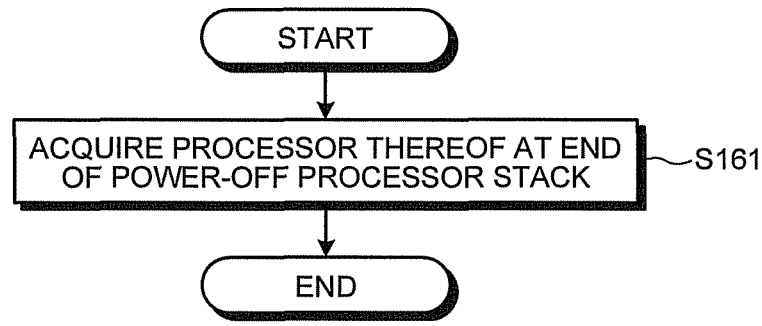
FIG. 23 is a flowchart that illustrates the operation of a power-off processor registering process according to the fourth embodiment.

FIG. 23 is a flowchart that illustrates the operation of the power-off processor registering process 413. The power-off processor registering process 413 registers the identification information of a processor that performs the power-off processor registering process 413 at the end of the power-off processor stack 412 in Step S161 and ends the operation.

After performing the power-off processor registering process 413, the thread execution control task 411 causes the processor that executes the thread execution control task 411 to transit to the power-off state in Step S142 and stops the operation in Step S143. When the processor that performs the thread execution control task 411 is caused to transit to the power-on state by a thread execution control task 411 that is executed by another processor in Step S143, the thread execution control task 411 performs the process of Step S131. In a case where the number of processors that are in the power-on state is less than the set value of the number of processors (No in Step S140), the thread execution control task 411 performs the process of Step S131.

In this way, the multiprocessor system 4 according to the fourth embodiment causes a process that has later timing of the transition to the power-off state to transit to the power-on state with higher priority, and accordingly, it is possible to bias the processor usage.

Fifth Embodiment

A multiprocessor system according to a fifth embodiment causes a processor having earlier timing of the transition to the power-off state to transit to the power-on state with higher priority.

Figure 24:
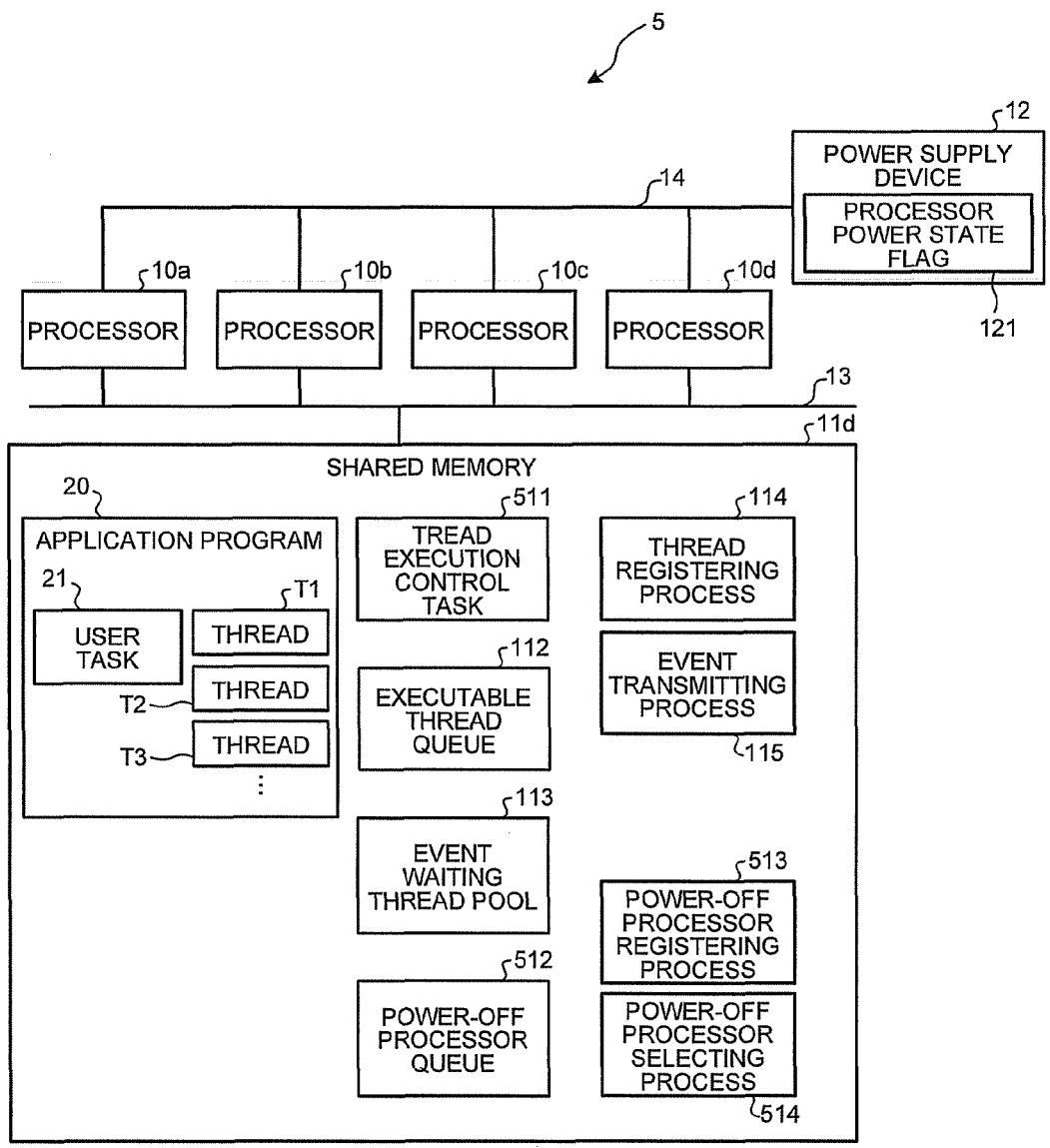
FIG. 24 is a configuration diagram of a multiprocessor system according to a fifth embodiment.

FIG. 24 is a configuration diagram of the multiprocessor system according to the fifth embodiment. In description of the fifth embodiment, the same name and the same reference numeral are assigned to the same constituent element as that of the first embodiment, and duplicate description will not be presented.

The multiprocessor system 4 according to the fifth embodiment includes: four processors 10a to 10d; a shared memory 11d; a power supply device 12; a bus 13; and power supply lines 14. The shared memory 11d stores a thread execution control task 511, a thread registering process 114, an event transmitting process 115, a power-off processor registering process 513, and a power-off processor selecting process 514 in advance. In addition, the shared memory 11d includes an executable thread queue 112, an event waiting thread pool 113, and a power-off processor queue 512. The power-off processor queue 512 has a data structure that employs an FIFO structure in which information used for identifying a processor that is in the power-off state is registered.

Figure 25:
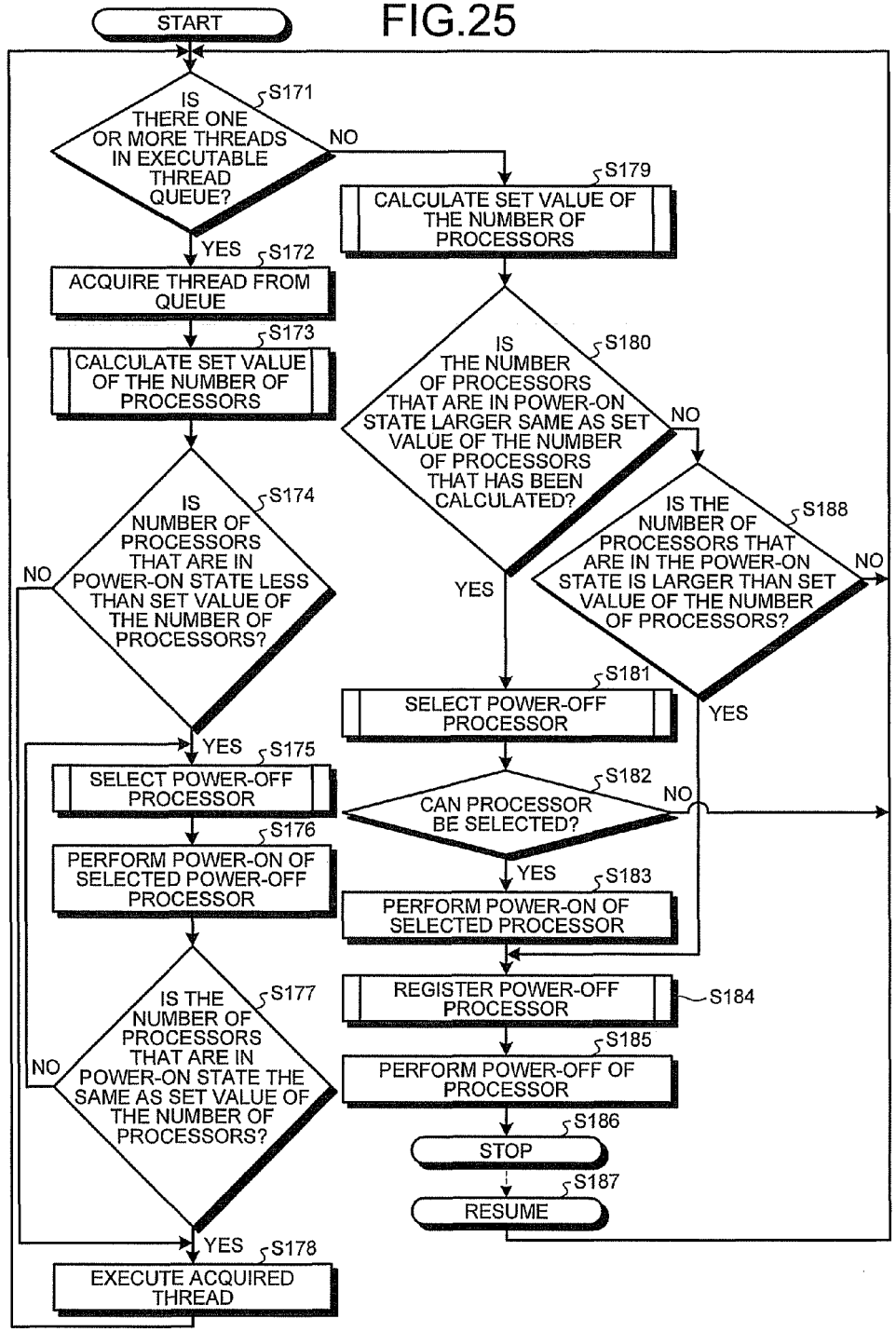
FIG. 25 is a flowchart that illustrates the operation of a thread execution control task according to the fifth embodiment.

FIG. 25 is a flowchart that illustrates the operation of the thread execution control task 511 according to the fifth embodiment. First, the thread execution control task 511 determines whether or not one or more threads are registered in the executable thread queue 112 in Step S171. In a case where one or more threads are registered in the executable thread queue 112 (Yes in Step S171), the thread execution control task 511 extracts one thread from the executable thread queue 112 in Step S172. Then, the thread execution control task 511 calculates the set value of the number of processors in Step S173. Then, the thread execution control task 511 determines whether or not the number of processors that are in the power-on state at that time point is less than the set value of the number of processors in Step S174. In a case where the number of processors that are in the power-on state is less than the set value of the number of processors (Yes in Step S174), the thread execution control task 511 performs the power-off processor selecting process 514 in Step S175.

Figure 26:
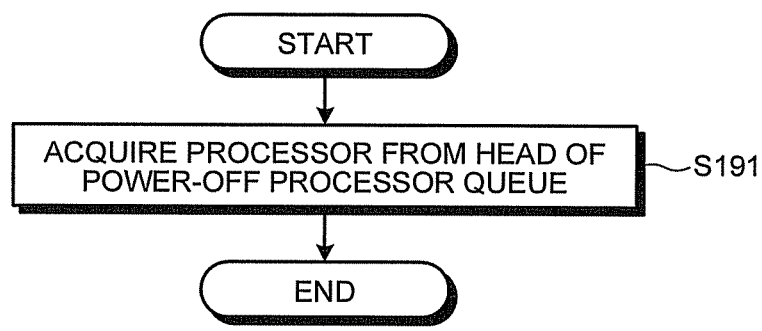
FIG. 26 is a flowchart that illustrates the operation of a power-off processor selecting process according to the fifth embodiment.

FIG. 26 is a flowchart that illustrates the operation of the power-off processor selecting process 514. The power-off processor selecting process 514 extracts the identification information of a processor that is registered at the head of the power-off processor queue 512 in Step S191 and ends the operation.

The thread execution control task 511 causes a processor, which is in the power-off state, represented by the identification information extracted by the process of Step S175 to transit to the power-on state in Step S176 and determines whether or not the number of processors that are in the power-on state at that time point is the same as the set value of the number of processors in Step S177. In a case where the number of processors that are in the power-on state is not same as the set value of the number of processors (No in Step S177), the thread execution control task 511 performs the process of Step S175. On the other hand, in a case where the number of processors that are in the power-on state is the same as the set value of the number of processors (Yes in Step S177), the thread execution control task 511 executes the thread acquired by the process of Step S172 in Step S178. Then, when the execution of the thread is completed, the thread execution control task 511 performs the process of Step S171.

In a case where there is no thread that is registered in the executable thread queue 112 (No in Step S171), the thread execution control task 511 calculates the set value of the number of processors in Step S179. Then, the thread execution control task 511 determines whether or not the number of processors that are in the power-on state at that time point is the same as the set value of the number of processors in Step S180. In a case where the number of processors that are in the power-on state is the same as the set value of the number of processors (Yes in Step S180), the thread execution control task 511 performs the power-off processor selecting process 514 again in Step S181 and determines whether or not the identification information of a processor that is in the power-off state is acquired in Step S182. In a case where the identification information of a processor that is in the power-off state cannot be acquired due to no presence of a processor that is in the power-off state or the like (No in Step S182), the thread execution control task 511 performs the process of Step S171.

In a case where the identification information of a processor that is in the power-off state is acquired (Yes in Step S182), the thread execution control task 511 causes the process represented by the acquired identification information from the power-off state to the power-on state in Step S183 and performs the power-off processor registering process 513 in Step S184.

Figure 27:
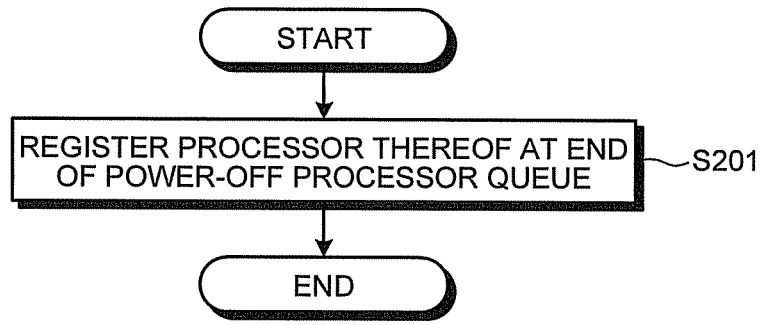
FIG. 27 is a flowchart that illustrates the operation of a power-off processor registering process according to the fifth embodiment.

FIG. 27 is a flowchart that illustrates the operation of the power-off processor registering process 513 according to the fifth embodiment. The power-off processor registering process 513 registers the identification information of a processor that performs the power-off processor registering process 513 at the end of the power-off processor queue 512 in Step S201 and ends the operation.

After performing the power-off processor registering process 513, the thread execution control task 511 causes the processor that performs the thread execution control task 511 to transit to the power-off state in Step S185 and stops the operation in Step S186. When the processor that executes the thread execution control task 511 is caused to transit to the power-on state by a thread execution control task 511 that is executed by another processor in Step S187, the thread execution control task 511 performs the process of Step S171.

In a case where the number of processors that are in the power-on state is not the same as the set value of the number of processors (No in Step S180), the thread execution control task 511 determines whether or not the number of processors that are in the power-on state at that time point is larger than the set value of the number of processors in Step S188. The thread execution control task 511 performs the process of Step S184 in a case where the number of processors that are in the power-on state is larger than the set value of the number of processors (Yes in Step S188), and performs the process of Step S171 in a case where the number of processors that are in the power-on state is less than the set value of the number of processors (No in Step S188).

In this way, since the multiprocessor system 5 according to the fifth embodiment causes a process that has earlier timing of the transition to the power-off state to transit to the power-on state with higher priority, the processors 10a to 10d are evenly used, whereby the temperatures of the processors 10a to 10d can be approximately averaged.

In the description of the first to fifth embodiments, although the multiprocessor systems have been described to calculate the set value of the number of processors by adding the number of threads of which the number of waiting events registered in the event waiting thread pool 113 is a value set in advance to the number of threads registered in the executable thread queue 112 and subtracting the threshold value of the number of event waiting threads from a resultant value (first calculation method), the method of calculating the set value of the number of processors is not limited thereto as long as the calculation is performed based on the number of executable threads and the number of threads of which the number of waiting events is a predetermined value or less.

For example, the set value of the number of processors may be calculated by multiplying the number of threads of which the number of waiting events is a predetermined number or less by a predetermined weighting factor and adding the number of executable threads to a resultant number (second calculation method). According to the second calculation method, by setting the weighting factor to a value that is less than one, even when the number of threads of which the number of waiting events is a predetermined number or less suddenly increases or decreases, a variation of the set value of the number of processors can be suppressed to be small.

In addition, the method of calculating the set value of the number of processors may be dynamically changed at timing that is programmed in the user task or timing that is based on the structure of a plurality of threads that are included in the application program 20.

In this way, since the multiprocessor systems according to the first to fifth embodiments individually stop or resume the supply of power from the power supply device 12 to a processor that executes the thread execution control task 111 out of the processors 10a to 10d based on the number of threads that are registered in the executable thread queue 112 and the number of threads of which the number of events registered in the event waiting thread pool 113 is a predetermined threshold value or more, the power consumption can be reduced while performance degradation is suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A multiprocessor system comprising:
a plurality of processors;
a power supply device that individually supplies power to the processors; and
a shared memory that stores a plurality of threads, each thread being executed by one of the plurality of processors,
wherein the shared memory includes:
a thread pool in which threads each having waiting events are registered in association with the numbers of the waiting events; and
a thread queue in which threads having no waiting event are registered, and
wherein the plurality of processors include:
one or more first processors each acquiring a first thread from the thread queue and executing the first thread when power is supplied from the power supply device;
a second processor that updates the number of waiting events of a second thread, which is registered in the thread pool, having completion of required procedure for the second thread by the first thread as a waiting event and registers the second thread to the thread queue when the number of the waiting events of the second thread is zero; and
a third processor that individually stops or resumes supply of power from the power supply device to the first processors based on the number of threads that are registered in the thread queue and the number of threads of which the number of waiting events is a first threshold value or less.

2. The multiprocessor system according to claim 1, wherein the third processor calculates a set value of the number of processors by adding the number of threads of which the number of waiting events is the first threshold value or less to the number of threads registered in the thread queue and subtracts a second threshold value from a resultant value and stops or resumes the supply of power to the first processors such that the number of the first processors to which power is supplied is the same as the set value of the number of processors.

3. The multiprocessor system according to claim 2, further comprising a fourth processor that dynamically changes the second threshold value at timing that is programmed in advance or timing that is based on a structure of the threads stored in the shared memory.

4. The multiprocessor system according to claim 1, wherein the third processor calculates a set value of the number of processors by multiplying the number of threads of which the number of waiting events is the first threshold value or less by a predetermined weighting factor and adding the number of threads registered in the thread queue to a resultant value and stops or resumes the supply of power to the first processors such that the number of the first processors to which power is supplied is the same as the set value of the number of processors.

5. The multiprocessor system according to claim 1, further comprising a fourth processor that dynamically changes the first threshold value at timing that is programmed in advance or timing that is based on a structure of the threads stored in the shared memory.

6. The multiprocessor system according to claim 1,
wherein the shared memory further includes a power-off processor stack in which processors, for which the supply of power is stopped, are registered, and
wherein the third processor registers the first processor for which the supply of power is stopped at an end of the power-off processor stack at a time when the supply of power to one processor out of the first processors is stopped and selects the first processor, which is registered at the end of the power-off processor stack, as a processor for which the supply of power is resumed at a time when the supply of power to one of the first processors is resumed.

7. The multiprocessor system according to claim 1,
wherein the shared memory further includes a power-off processor queue in which processors, for which the supply of power is stopped, are registered, and
wherein the third processor registers the first processor for which the supply of power is stopped at an end of the power-off processor queue at a time when the supply of power to one processor out of the first processors is stopped and selects the first processor, which is registered at a head of the power-off processor queue, as a processor for which the supply of power is resumed at a time when the supply of power to one of the first processors is resumed.

8. The multiprocessor system according to claim 1,
wherein the first processors and the second processor are the same processors, and
wherein, when the first processor executes the first thread, the first processor updates the number of waiting events of the second thread that has the first thread executed by the first processor as a waiting event.

9. The multiprocessor system according to claim 2,
wherein the first processors and the third processor are the same processors, and wherein each of the first processors resumes the supply of power to the other first processors for which the supply of power is stopped at a time when the number of the first processors for which the supply of power is performed is less than the set value of the number of processors and stops power supplied to the each of the first processors when the number of the first processors to which the power is supplied is larger than the set value of the number of processors.

10. The multiprocessor system according to claim 4, wherein the first processors and the third processor are the same processors, and
wherein each of the first processors resumes the supply of power to the other first processors for which the supply of power is stopped at a time when the number of the first processors for which the supply of power is performed is less than the set value of the number of processors and stops power supplied to the each of the first processors when the number of the first processors to which the power is supplied is larger than the set value of the number of processors.

11. The multiprocessor system according to claim 1, further comprising a fourth processor that registers each of a plurality of threads stored by the shared memory in the thread pool or the thread queue based on the number of waiting events at the time of start-up.

12. The multiprocessor system according to claim 2,
wherein the power supply device includes flag that describes whether power is supplied or stopped for each of the first processors, and
wherein the third processor specifies the number of the first processors to which power is supplied by referring to the flag.

13. The multiprocessor system according to claim 4,
wherein the power supply device includes flag that describes whether power is supplied or stopped for each of the first processors, and
wherein the third processor specifies the number of the first processors to which power is supplied by referring to the flag.

14. A method of controlling power that is implemented by a multiprocessor system that includes a plurality of processors, a power supply device that individually supplies power to the processors, and a shared memory that stores a plurality of threads, each thread being executed by one of the processors, comprising:
registering threads each having the number of waiting events that are stored in the shared memory in a thread pool in association with the numbers of waiting events;
registering threads each not having the number of waiting events that are stored in the shared memory in a thread queue;
acquiring a first thread from the thread queue and executing the acquired first thread by using a processor out of the plurality of processors to which power is supplied from the power supply device;

updating the number of waiting events of a second thread, which is registered in the thread pool, having completion of required procedure for the second thread by the first thread as a waiting event;
registering the second thread to the thread queue when the number of the waiting events of the second thread is zero;
calculating a set value of the number of processors based the number of threads that are registered in the thread queue and the number of threads of which the number of waiting events is a first threshold value or less; and
individually stopping or resuming supply of power from the power supply device to the processors such that the number of processors to which power is supplied is the same as the set value of the number of processors.

15. The method of controlling power according to claim 14,
wherein, in the calculating of a set value of the number of processors, the number of threads of which the number of waiting events is the first threshold value or less is added to the number of threads registered in the thread queue, and a second threshold value is subtracted from a resultant value.

16. The method of controlling power according to claim 15, further comprising dynamically changing the second threshold value at timing that is programmed in advance or timing that is based on a structure of the threads stored in the shared memory.

17. The method of controlling power according to claim 14,
wherein, in the calculating of a set value of the number of processors, the number of threads of which the number of waiting events is the first threshold value or less is multiplied by a predetermined weighting factor, and the number of threads registered in the thread queue is added to a value acquired through the multiplication.

18. The method of controlling power according to claim 14, further comprising dynamically changing the first threshold value at timing that is programmed in advance or timing that is based on a structure of the threads stored in the shared memory.

19. The method of controlling power according to claim 14, wherein, when the supply of power to one of the processors is resumed, a processor for which timing when the supply of power is stopped is the latest is selected, and the supply of power is resumed for the selected processor.

20. The method of controlling power according to claim 14, wherein, when the supply of power to one of the processors is resumed, a processor for which timing when the supply of power is stopped is the earliest is selected, and the supply of power is resumed for the selected processor.

* * * * *